United States Patent
Sun

(10) Patent No.: US 7,774,759 B2
(45) Date of Patent: Aug. 10, 2010

(54) METHODS AND APPARATUS TO DETECT A MACROSCOPIC TRANSACTION BOUNDARY IN A PROGRAM

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1550 days.

(21) Appl. No.: 10/833,762

(22) Filed: Apr. 28, 2004

(65) Prior Publication Data

US 2004/0216082 A1 Oct. 28, 2004

Related U.S. Application Data

(63) Continuation-in-part of application No. 10/608,324, filed on Jun. 27, 2003, now Pat. No. 7,472,262, which is a continuation-in-part of application No. 10/424,356, filed on Apr. 28, 2003, now Pat. No. 7,647,585.

(51) Int. Cl.
*G06F 9/44* (2006.01)
*G06F 9/45* (2006.01)

(52) U.S. Cl. .......................... 717/128; 717/131; 717/154

(58) Field of Classification Search ........................ None
See application file for complete search history.

(56) References Cited

U.S. PATENT DOCUMENTS

| | | | |
|---|---|---|---|
| 5,606,685 A | 2/1997 | Frandeen | |
| 5,850,632 A | 12/1998 | Robertson | |
| 6,055,650 A | 4/2000 | Christie | |
| 6,237,065 B1 | 5/2001 | Banerjia et al. | |
| 6,415,359 B1 | 7/2002 | Kimura et al. | |
| 6,470,297 B1 * | 10/2002 | Ford | 702/179 |
| 6,571,318 B1 | 5/2003 | Sander et al. | |
| 6,622,168 B1 | 9/2003 | Datta | |
| 6,751,707 B2 | 6/2004 | Magoshi | |
| 6,752,335 B2 | 6/2004 | Levia | |
| 6,971,092 B1 | 11/2005 | Chilimbi | |
| 7,007,001 B2 * | 2/2006 | Oliver et al. | 706/21 |
| 7,043,608 B2 | 5/2006 | Sun | |
| 2001/0042172 A1 | 11/2001 | Duesterwald et al. | |
| 2001/0052064 A1 | 12/2001 | Chaudhry et al. | |
| 2002/0152361 A1 | 10/2002 | Dean et al. | |
| 2003/0105942 A1 | 6/2003 | Damron et al. | |
| 2003/0140203 A1 | 7/2003 | Jourdan et al. | |

(Continued)

OTHER PUBLICATIONS

Sherwood et al., "Phase Tracking and Prediction", Jun. 2002, Technical Report CS2002-0710, UC San Diego, pp. 1-12.*
Sherwood et al., "Automatically Characterizing Large Scale Program Behavior", 2002, ACM, pp. 1-13.*

(Continued)

*Primary Examiner*—Michael J Yigdall
*Assistant Examiner*—Ben C Wang
(74) *Attorney, Agent, or Firm*—Hanley, Flight & Zimmerman, LLC

(57) ABSTRACT

Methods and apparatus are disclosed to detect a macroscopic transaction boundary in a program workload. An example method includes identifying a transactional entropy value associated with macroscopic transactions of the workload; developing a trace of a program; identifying a sequence of program states from the trace; determining program state entropy values associated with the program states identified in the sequence; and identifying a program state in the sequence of program states and associated with a program state entropy value that is substantially equal to the transactional entropy value as a macroscopic transaction boundary.

24 Claims, 25 Drawing Sheets

U.S. PATENT DOCUMENTS

| | | | |
|---|---|---|---|
| 2004/0103408 A1 | 5/2004 | Chilimbi et al. | |
| 2004/0111708 A1 | 6/2004 | Calder et al. | |
| 2004/0154011 A1 | 8/2004 | Wang et al. | |
| 2004/0158818 A1* | 8/2004 | Smith et al. | 717/127 |
| 2004/0216013 A1* | 10/2004 | Sun | 714/45 |

OTHER PUBLICATIONS

Dhodapkar et al., "Managing Multi-Configuration Hardwaer via Dynamic Working Set Analysis", 2002, IEEE, pp. 1-12.*
Yusuke et al., "Maximum Entropy Estimation for Feature Forests", HLT 2002, pp. 292-297.*
Robert Malouf, "A Comparison of Algorithms for Maximum Entropy Parameter Estimation", 2002, Association for Computational Linguistics, pp. 1-7.*
Doug Joseph et al., *"Prefetching using Markov Predictors"*, 1997 Proceedings of the International Symposium on Computer Architecture (ISCA '97), Jun. 1997, Denver Colorado.
Ashutosh S. Dhodapkar et al., *"Managing Multi-Configuration Hardware via Dynamic Working Set Analysis"*, May, 2002.
Trishul M. Chilimbi et al., *"Dynamic Hot Data Stream Prefetching for General-Purpose Programs"*, PLDI-2002, May, 2002.
Mingqiu Sun et al., *"Entropy-based Characterization of Program Phase Behaviors"*, Feb. 2004, Madrid Spain.
S. Dhodapkar et al., *"Comparing Program Phase Detection Techniques"*, Micro-2003, 2003.
V. Bala et al., *"Dynamo: A transparent dynamic optimization system"*. PLDI '2000, Jun. 2000.
B. Balasubramonian et al., *"Memory Hierarchy Reconfiguration for Energy and Performance in General Purpose Architectures"*, Micro-2000, Dec. 2000.
J. E. Smith et al., *"Dynamic Microarchitecture Adaptation via Co-designed Virtual Machines"*, ISSCC-2002, Feb. 2002.
M. Huang et al., *"Positional Adaptation of Processors: Application to Energy Reduction"*, ISCA-2003, Jun. 2003.
T. Sherwood et al., *"Phase Tracking and Prediction"*, ISCA-2003, Jun. 2003.
T. Sherwood et al., *"Automatically Characterizing Large Scale Program Behavior"*, ASPLOS-2002, Oct. 2002.
C.E. Shannon, *"A Mathematical Theory of Communication"*, Bell Syst. Tech. J., 27, 379-423, 623-656. Jul. and Oct., 1948.
*Standard Performance Evaluation Corperation* (SPEC) JBB2000 [online]. SPEC [retrieved on May 11, 2004]: Retrieved from the Internet: <URL: http://www.spec.org/jbb2000/>, 2 pages.
*Standard Performance Evaluation Corperation* (SPEC) JBB2000 [online]. SPECjAppServer [retrieved on May 14, 2004]: Retrieved from the Internet: <URL: http://www.spec.org/jAppServer2002/>, 2 pages.
*Dinero IV Trace-Driven Uniprocessor Cache Simulator*: [retrieved on May 14, 2004]: Retrieved from the Internet: <URL: http://www.cs.wisc.edu/~markhill/DineroIV/>, 2 pages.
Hazelwood et al., *Code Cache Management Schemes for Dynamic Optimizers*, Proceedings of the Sixth Annual Workshop on Interaction between Compilers and Computer Architectures (Interact'02), 2002, 9 pages.
"Phase Tracking and Prediction", Sherwood et al., ACM SIGARCH Computer Architecture News, vol. 31, Issue 2, (May 2003), pp. 336-339, ISSN:0163-5964, http://portal.acm.org.
"Reports Listed by Author", pp. 1-12, www.cs.ucsd.edu/Dienst/UI/2.0/ListAuthors/A-Z/authority=ncstrl.ucsd.
"Reports Listed by Year", pp. 1-4, www.cse.ucsd.edu/Dienst/UI/2.0/ListYears/1999-2005?/.
Sherwood et al., Abstract for Phase Tracking and Predictions, http://web.archive.org/web/20021119050935/http://www-cse.ucsd.edu/Dienst/UI/2.0/Describe/ncstrl.ucsd_cse/CS2002-0710, Nov. 19, 2002.
"Declaration of James A. Flight", filed with the United States Patent and Trademark Office for U.S. Appl. No. 10/424,356.
Exhibit 1 to Declaration of James A Flight—Sherwood et al., Phase Tracking and Prediction, technical report CS2002-0710, UC San Diego, retrieved Jul. 16, 2007, http://www.cse.ucsd.edu/Dienst/UI/2.0/Describe/ncstrl.ucsd_cse/CS2002-0710.
Exhibit 2 to Declaration of James A Flight—.
Exhibit 3 to Declaration of James A Flight—"Publications", retrieved Jul. 16, 2007, http://www-cse.ucsd.edu/users/calder/papers.html.
Exhibit 4 to Declaration of James A Flight—Sherwood et al., Phase Tracking and Prediction, 30th International Symposium on Computer Architecture, Jun. 2003.
Exhibit 5 to Declaration of James A Flight—Tim Sherwood email of Oct. 20, 2006 to James A. Flight.
Exhibit 6 to Declaration of James A Flight—Program Announcement for "The thirtieth International Symposium on Computer Architecture (ISCA)", retrieved Jul. 16, 2007, http://cs.nyu.edu/isca03/.
Exhibit 7 to Declaration of James A Flight—"Phase Tracking and Prediction", Sherwood et al., ACM SIGARCH Computer Architecture News, vol. 31, Issue 2, (May 2003), pp. 336-339, ISSN:0163-5954, http://portal.acm.org.
Exhibit 8 to Declaration of James A Flight—Sherwood et al., Phase Tracking and Prediction, 30th International Symposium on Computer Architecture, Jun. 2003.
Exhibit 9 to Declaration of James A Flight—"Reports Listed by Year", pp. 1-4, www.cse.ucsd.edu/Dienst/UI/2.0/ListYears/1999-2005?/.
Exhibit 10 to Declaration of James A Flight—"Reports Listed by Author", pp. 1-12, www.cs.ucsd.edu/Dienst/UI/2.0/ListAuthors/A-Z/authority=ncstrl.ucsd.
Exhibit 11 to Declaration of James A Flight—"Automatically Characterizing Large Scale Program Behavior," 2002, ISBN 1-58113-574-2.
Exhibit 12 to Declaration of James A Flight—Internet Archive Wayback Machine, search for "http://www-cse.ucsd.edu/Dienst/UI/2.0/Describe/ncstrl.ucsd_cse/CS2002-0710", search results for Jan. 1, 1996 to Jul. 6, 2007, http://web.archive.org/web/*/http://www-cse.ucsd.edu/Dienst/UI/2.0/Describe/ncstrl.ucsd_cse/CS2002-0710, retrieved Jul. 5, 2007.
Exhibit 13 to Declaration of James A Flight—Sherwood et al., Abstract for Phase Tracking and Predictions, http://web.archive.org/web/20021119050935/http://www-cse.ucsd.edu/Dienst/UI/2.0/Describe/ncstrl.ucsd_cse/CS2002-0710, retrieved Jul. 5, 2007.
Exhibit 14 to Declaration of James A Flight—Sherwood et al., Abstract for Phase Tracking and Predictions, http://web.archive.org/web/20021119050935/http://www-cse.ucsd.edu/Dienst/UI/2.0/Describe/ncstrl.ucsd_cse/CS2002-0710, retrieved Jul. 5, 2007.
Exhibit 15 to Declaration of James A Flight—James A. Flight email of Jul. 7, 2007 to Calder@cs.ucsd.edu.
Exhibit 16 to Declaration of James A Flight—James A. Flight email of Jul. 16, 2007 to calder@cs.ucsd.edu.
Exhibit 17 to Declaration of James A Flight—Automatically Generated Delivery Status Notification of James A. Flight email of Jul. 16, 2007 to calder@cs.ucsd.edu.
Exhibit 18 to Declaration of James A Flight—CSE Computing Support [webmaster@cs.ucsd.edu] email of Jul. 6, 2007 to James A. Flight.
Chinese Office action for corresponding Chinese Patent Application No. 03157926.4 dated Apr. 7, 2006 (6 pages).
English Translation of Chinese Office action for corresponding Chinese Patent Application No. 03157926.4 dated Apr. 7, 2006 (8 pages).
United States Patent and Trademark Office, "Notice of Allowance and Fee(s) Due," issued in connection with U.S. Appl. No. 10/424,356, mailed Nov. 23, 2009, 11 pages.
Miyao et al., "Maximum Entropy Estimation for Feature Forests," Proceedings of HLT 2002, Second International Conference on Homan Language Technology Research, San Fransisco, March 2002, 6 pages (292-297).
Malouf, "A Comparison of Algorithms for Maximum Entropy Parameter Estimation," Alfa-Informatica, The Netherlands, Aug. 2002, 7 pages.
Korhonen et al., "On the Robustness of Entropy-Based Similarity Measures in Evaluation of Subcategorization Acquisition Systems," Aug. 2002, 7 pages.
Burgess et al., "Measuring System Normality," ACM Transactions on Computer Systems, vol. 20, No. 2, May 2002, pp. 125-160 (36 pages).

* cited by examiner

| STATE SIGNATURE: | | | 0101100101110 | | |
|---|---|---|---|---|---|
| AGE: | | | X | | |
| USAGE FREQUENCY: | | | Y | | |
| ENTROPY: | | | Z | | |
| STATE: | A | OCCURRENCE TIMES: | 00:00:00; 00:05:13 | PROBABILITY: | 0.63 |
| STATE: | C | OCCURRENCE TIMES: | 00:02:04; 00:09:42 | PROBABILITY: | 0.12 |
| STATE: | E | OCCURRENCE TIMES: | 00:00:13; 00:02:43 | PROBABILITY: | 0.08 |
| STATE: | G | OCCURRENCE TIMES: | 00:08:06; 00:09:18 | PROBABILITY: | 0.05 |
| STATE: | L | OCCURRENCE TIMES: | 00:10:03 | PROBABILITY: | 0.02 |
| STATE: | M | OCCURRENCE TIMES: | 00:07:53 | PROBABILITY: | 0.02 |
| . . . | . . . | . . . | . . . | . . . | . . . |
| . . . | . . . | . . . | . . . | . . . | . . . |
| . . . | . . . | . . . | . . . | . . . | . . . |
| STATE: | V | OCCURRENCE TIMES: | 00:13:31; 00:15:37 | PROBABILITY: | 0.01 |

FIG. 5

| STATE SIGNATURE: | | | 0101100101110 | | | |
|---|---|---|---|---|---|---|
| AGE: | | | X | | | |
| USAGE FREQUENCY: | | | Y | | | |
| ENTROPY: | | | Z | | | |
| STATE: | A | OCCURRENCE TIMES: | 00:00:00; 00:05:13 | PROBABILITY: | 0.63 | |
| STATE: | C | OCCURRENCE TIMES: | 00:02:04; 00:09:42 | PROBABILITY: | 0.12 | |
| STATE: | E | OCCURRENCE TIMES: | 00:00:13; 00:02:43 | PROBABILITY: | 0.08 | |
| STATE: | G | OCCURRENCE TIMES: | 00:08:06; 00:09:18 | PROBABILITY: | 0.05 | |
| STATE: | L | OCCURRENCE TIMES: | 00:10:03 | PROBABILITY: | 0.02 | |
| STATE: | M | OCCURRENCE TIMES: | 00:07:53 | PROBABILITY: | 0.02 | |
| ... | ... | ... | ... | ... | ... | |
| ... | ... | ... | ... | ... | ... | |
| ... | ... | ... | ... | ... | ... | |
| STATE: | V | OCCURRENCE TIMES: | 00:13:31; 00:15:37 | PROBABILITY: | 0.01 | |
| OBJECT REFERENCES: | | | A1 | A3 | A456 | A358 |
| A2 | A47 | A13256 | A5432 | A67834 | A89045 | A56732 | A45098 |
| A43 | A33 | A5623 | A1234 | A5432 | A5678 | A47890 | A87 |
| ... | ... | ... | ... | ... | ... | ... | ... |
| ... | ... | ... | ... | ... | ... | ... | ... |
| ... | ... | ... | ... | ... | ... | ... | ... |
| A764 | A368 | A412 | A8345 | A21 | A54 | A43876 | A11 |

FIG. 11

METHODS AND APPARATUS TO DETECT A MACROSCOPIC TRANSACTION BOUNDARY IN A PROGRAM

RELATED APPLICATION

This patent issued from a continuation-in-part of U.S. application Ser. No. 10/608,324, which was filed on Jun. 27, 2003 and which is a continuation-in-part of U.S. application Ser. No. 10/424,356, which was filed on Apr. 28, 2003.

FIELD OF THE DISCLOSURE

This disclosure relates generally to program management, and, more particularly, to methods and apparatus to detect a macroscopic transaction boundary in a program.

BACKGROUND

Programs executed by computers and other processor based devices typically exhibit repetitive patterns. It has long been know that identifying such repetitive patterns provides an opportunity to optimize program execution. For example, software and firmware programmers have long taken advantage of small scale repetitive patterns through the use of iterative loops, etc. to reduce code size, control memory allocation and perform other tasks seeking to optimize and streamline program execution.

Recently, there has been increased interest in seeking to identify larger scale repetition patterns in complicated workloads such as, for example, managed run-time environments and other server-based applications, as a mechanism to optimize handling of those workloads. For instance, it is known that a workload may be conceptualized as a series of macroscopic transactions. As used herein, the terms macroscopic transaction and sub-transaction refer to a business level transaction and/or an application software level transaction. For instance, the workload of a server at an Internet retailer may be conceptualized as an on-going sequence of macroscopic transactions and sub-transactions such as product display, order entry, order processing, customer registration, payment processing, etc. Moving to a more microscopic level, each of the macroscopic transactions in the workload may be seen as a series of program states. It is desirable to optimize the execution of workloads by, for example, reducing the time it takes the hosting computer to transition between and/or execute program states, phases, and/or macroscopic transactions. Therefore, there is an interest in identifying repetition patterns of program states in macroscopic transactions in the hope of predicting program state transitions, optimizing the execution of program states, phases, and/or macroscopic transactions, and increasing the throughput of the workload associated with such program states, phases, and/or macroscopic transactions.

There have been attempts to exploit repetitive structures such as loops to, for example, prefetch data to a cache. However, those prior art methodologies have been largely limited to highly regular and simple workloads such as execution of scientific codes. Effectively predicting program states, phases, and/or macroscopic transactions for larger, more complicated workloads remains an open problem.

BRIEF DESCRIPTION OF THE DRAWINGS

FIG. 5 illustrates an example data structure which may be created for each identified state in the program.

FIG. 11 illustrates an example data structure which may be created by the apparatus of FIG. 10 for each identified state in the program.

DETAILED DESCRIPTION

As mentioned above, real world server applications typically exhibit repetitive behaviors. These repetitive behaviors are usually driven by local or remote clients requesting performance of tasks or business transactions defined by the application program interface (API) of the host site. Since the range of tasks available to the clients is limited, the client calls into the API manifest themselves as repetitive program execution patterns on the hosting server. As explained below, this type of repetitiveness provides efficiency opportunities which may be exploited through microprocessor architecture and/or software.

The basic unit of repetition within these repetitive program execution patterns is a macroscopic transaction or sub-transaction. A macroscopic transaction or sub-transaction may be thought of as one pathlength measured by instructions. The pathlength of such a transaction or sub-transaction is typically, for example, in the range of $10^4$ to $10^6$ instructions.

Each transaction or sub-transaction includes one or more program states. A program state is defined as a collection of information (e.g., a series of memory addresses and/or a series of instruction addresses) occurring in a given time window. A program state may be a measurement-dependent and tunable property. On the other hand, a transaction or a sub-transaction is typically an intrinsic property of a workload.

As explained further below, a program phase is defined as a set of ordered program states where there is a significant jump between intra-phase transitional entropies and the inter-phase transitional entropy of the ending program state within a phase. The significant jump in transitional entropy of the ending state is recognized by comparison to a threshold value, which is greater than all of the intra-phase transitional entropies. There may be one or multiple phases within a given macroscopic transaction.

Figure 1:
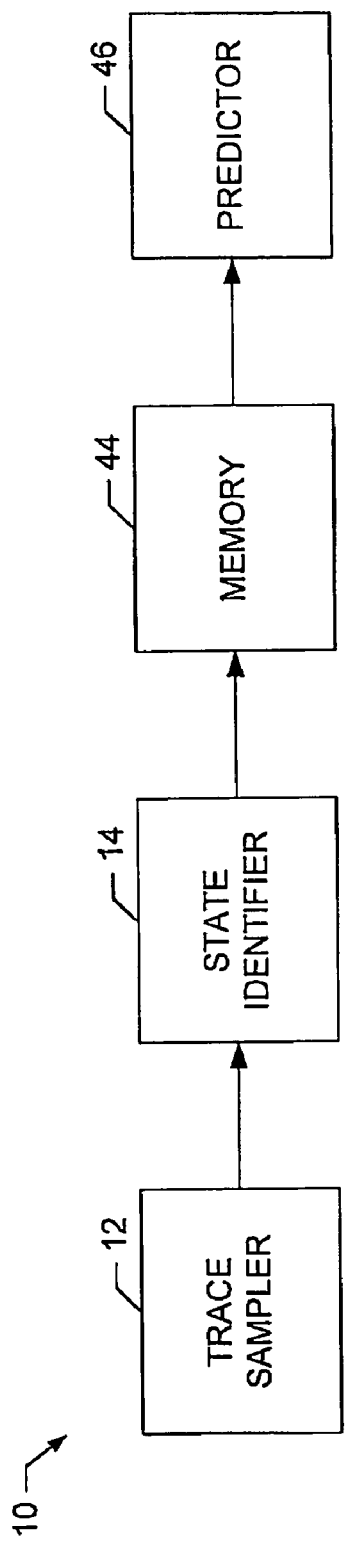
FIG. 1 is a schematic illustration of an example apparatus to detect patterns in programs.

FIG. 1 is a schematic illustration of an example apparatus 10 to predict program states of an executing program and/or to identify phases and/or macroscopic transactions of the program. For the purpose of developing a trace of a program of interest, the apparatus 10 is provided with a trace sampler 12. The trace sampler 12 operates in a conventional fashion to develop any type of trace of the program of interest. For example, the trace sampler 12 may employ a hardware counter such as a processor counter and/or software instrumentation such as managed run-time environment (MRTE) instrumentation to gather trace data from the executing program. For instance, the trace sampler 12 may capture the instruction addresses appearing in the program counter of a processor to create an instruction address trace. By way of another example, the trace sampler 12 may snoop an address bus associated with the cache of a processor to create a memory address trace. Persons of ordinary skill in the art will readily appreciate that many other techniques can be used to create the same or different types of traces. For instance, the trace sampler 12 could alternatively be configured to create a basic block trace.

In order to identify a sequence of program states from the trace generated by the trace sampler 12, the apparatus 10 is further provided with a state identifier 14. As will be appreciated by persons of ordinary skill in the art, the state identifier 14 may identify the states within the trace created by (or being created by) the trace sampler 12 in any number of ways. In the illustrated example, the state identifier 14 identifies the program states by comparing adjacent sets of data at least partially indicative of entries appearing in the trace. To make this comparison more manageable, the illustrated state identifier 14 translates the sets into bit vectors which function as short hand proxies for the data in the sets. The illustrated state identifier 14 then compares the bit vectors of adjacent sets and determines if the difference between the bit vectors is sufficient to indicate that a new state has occurred. Each of the sets of data may comprise sequential groups of entries in the trace. Either all of the entries in the trace may be used, or a subset of the entries may be used (e.g., every tenth entry may be used) to create the sets. Further, either a fraction of the entries selected to be in the set (e.g., the last eight bits) or the entire portion of the entry (e.g., all of the bits in the entry) may be used to create the bit vectors. Persons of ordinary skill in the art will readily appreciate that adjusting the resolution of the sets (e.g., by adjusting the number of entries skipped in creating the sets and/or by adjusting the amount or location of the bits of the entries in the trace that are used to create the bit vectors), may adjust the identities of the program states that are identified by the state identifier 14. Thus, the program state definitions are measurement-dependent and tunable.

Figure 2:
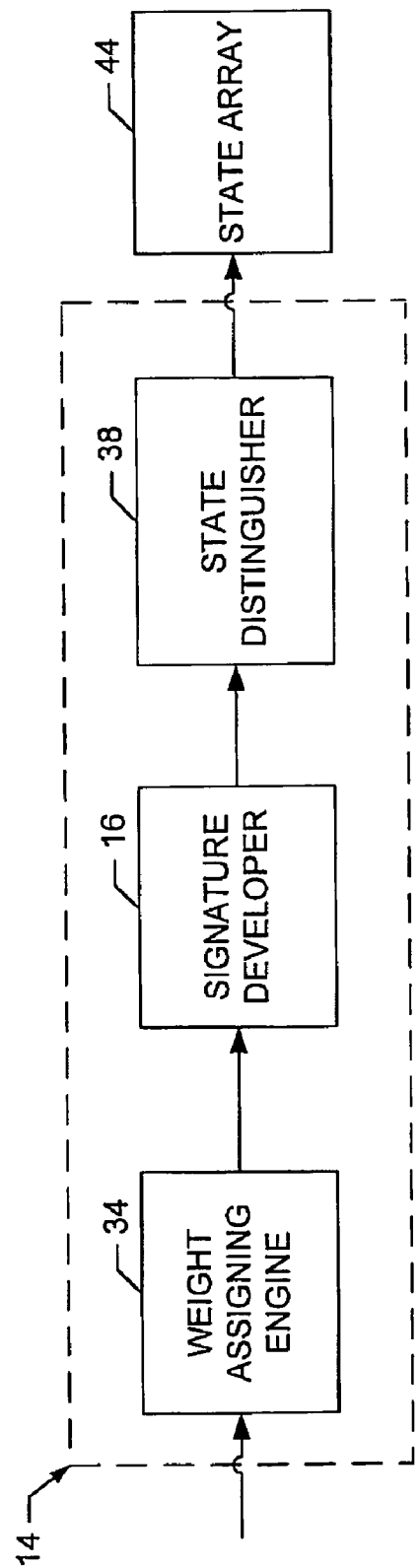
FIG. 2 is a more detailed schematic illustration of the example state identifier of FIG. 1.
Figure 3:
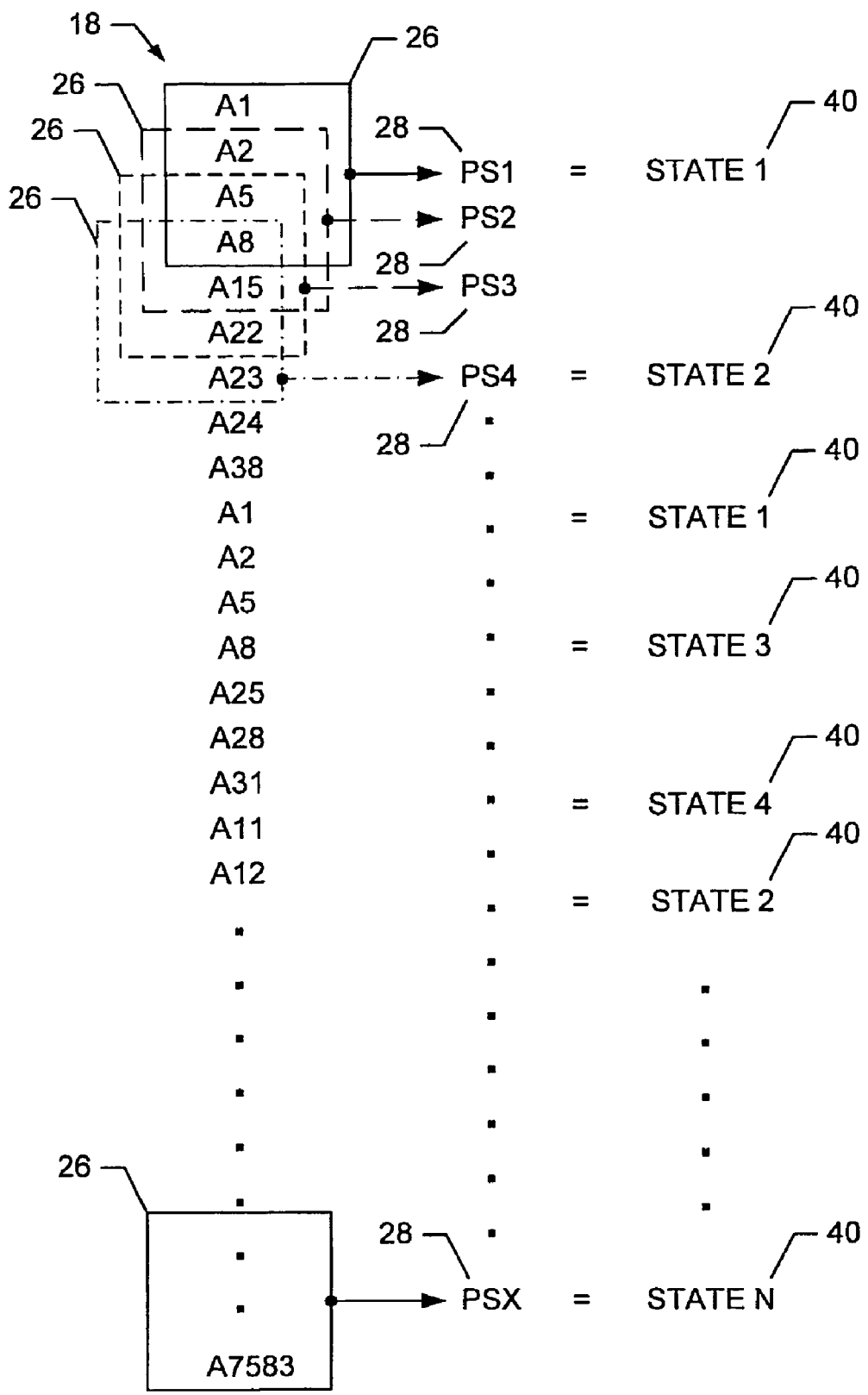
FIG. 3 is a schematic illustration of an example trace.

An example state identifier 14 is shown in FIG. 2. In the illustrated example, the state identifier 14 includes a signature developer 16 to develop possible state signatures from the sets of entries in the trace. To better illustrate the operation of the signature developer 16, consider the example trace shown in FIG. 3. In the example of FIG. 3, the trace 18 comprises a sequential series of entries representative in some fashion of a characteristic of the computer and/or a component thereof that changes over time as a result of executing the program of interest. For example, the entries may be instruction addresses appearing in the program counter of a processor, memory addresses appearing on an address bus of the cache associated with the processor, or any other recordable characteristic in the computer that changes as a result of executing the program. Persons of ordinary skill in the art will appreciate that the entries may be complete addresses, portions of complete addresses, and/or proxies for complete or partial addresses. In view of the broad range of possibilities for the types of data logged to create the entries of the trace 18, FIG. 3 generically describes these entries by the symbol "A" followed by a number. The number following the symbol "A" serves to uniquely distinguish the entries. To the extent execution of the program of interest causes the monitored characteristic used to create the trace to have the same value two or more times, the trace 18 will include the same entry two or more times (e.g., entry A5 appears twice in the trace 18). The number following the symbol "A" may indicate a relative position of the entry relative to the other entries. For example, if the trace 18 is an instruction address trace, each number following the letters may represent a location in memory of the corresponding address. For simplicity of explanation, unless otherwise noted, the following example will assume that the trace 18 is an instruction address trace reflecting the full memory addresses of the instructions executed by a processor running a program of interest.

The primary purpose of the signature developer 16 is to create proxies for the entries in the trace 18. In particular, the entries in the trace 18 may contain a significant amount of data. To convert these entries into a more manageable representation of the same, the signature developer 16 groups the entries into sets 26 and converts the sets 26 into possible state signatures 28. In the illustrated example, the possible state signatures 28 are bit vectors. The sets 26 may be converted into bit vectors 28 as shown in FIG. 4.

Figure 4:
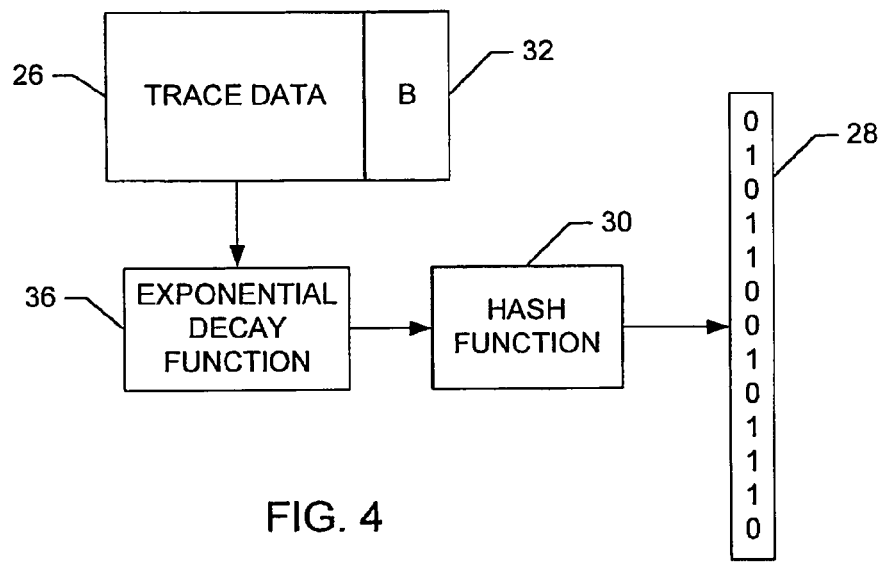
FIG. 4 is a diagram illustrating an example manner in which the signature developer and the weight assigning engine of FIG. 3 may operate to develop signatures.

In the example of FIG. 4 a random hashing function 30 is used to map the entries in a set 26 to an n-bit vector 28. In the example of FIG. 4, the value "B" 32 defines the resolution of the model (e.g., the number of entries in the set 26 that are skipped (if any) and/or processed by the hash function 30 to generate the n-bit vector 28). The basic use of a hash function 30 to map a set of entries from a trace 18 into a bit vector is well known to persons of ordinary skill in the art (see, for example, Dhodapkar & Smith, "Managing Multi-Configuration Hardware Via Dynamic Working Set Analysis," http://www.cae.wisc.edu/~dhodapka/isca02.pdf) and thus, in the interest of brevity, will not be further explained here. The interested reader can refer to any number of sources, including, for example, the Dhodapkar & Smith article mentioned above, for further information on this topic.

For the purpose of weighting the members of the sets 26 such that later members have greater weight than earlier members of the set 26 when mapping the set 26 of entries to the bit vector signature 28, the apparatus 10 is further provided with a weight assigning engine 34. As shown in the example mapping function of FIG. 4, the weight assigning engine 34 applies an exponential decay function 36 (e.g., $f_1 = e^{-t/T}$ where t=time and T=half lifetime) to the entries in a set 26 prior to operating on the set 26 with the hashing function 30. The exponential decay function 36 is applied to the entries in the set 26 of entries so that, when the hashing function 30 is used to convert the set 26 into a possible state signature 28, the latest entries in the set 26 have a greater impact on the values appearing in the possible state signature 28 than earlier values in the set 26. Persons of ordinary skill in the art will appreciate that, as with other structures and blocks discussed herein, the weight assigning engine 34 is optional. In other words, the exponential decay function 36 shown in FIG. 4 may be optionally eliminated.

As explained above, the illustrated signature developer 16 operates on sequential sets 26 of the entries appearing in the trace 18 to create a series of bit vectors 28 corresponding to those sets 26. Persons of ordinary skill in the art will readily appreciate that the signature developer 16 may group the entries in the trace 18 into sets 26 in any number of ways. However, in the illustrated example, the signature developer 16 creates the sets 26 such that adjacent sets 26 overlap (i.e., share at least one entry). In other words, the signature developer 16 uses a sliding window to define a series of overlapping sets 26. The number of entries in the trace 18 that are shared by adjacent sets 26 (i.e., the intersection of adjacent sets) may be as small as one element or as large as all but one element (see, for example, the overlapping sets 26 in FIG. 4). In examples in which the signature developer 16 creates adjacent intersecting sets 26, it is particularly advantageous to also use the weight assigning engine 34 such that the possible state signatures 28 created by the signature developer 16 are more responsive to the newer non-overlapping entries than to the overlapping entries and the older non-overlapping entries.

In order to identify program states based on the possible state signatures 28, the apparatus 10 is further provided with a state distinguisher 38. In the illustrated example, the state distinguisher 38 begins identifying program states by selecting one of the possible state signatures 28 as a first state signature 40 (e.g., State 1 in FIG. 3) to provide a reference point for the remainder of the analysis. Typically, the first possible state signature 28 (e.g., PS1 in FIG. 3) in the sequence of possible state signatures (e.g., PS1-PSN) is, by default, selected as the first state signature 40, but persons of ordinary skill in the art will readily appreciate that this selection is arbitrary and another one of the possible state signatures 28 (e.g., PS2-PSN) may alternatively be used as the first state signature 40.

Once a first state signature 40 is selected, the state distinguisher 38 compares the first state signature 40 to a next subsequent one of the possible state signatures 28 (e.g., PS2). For example, if the first state signature 40 is the first possible state signature, the first state signature 40 may be compared to the second possible state signature PS2 in the list of possible state signatures 28. If the next subsequent state signature 28 (e.g., PS2) differs from the first state signature 40 by at least a predetermined amount, there has been sufficient change in the measured parameter used to create the trace 18 to designate the corresponding program as having entered a new program state. Accordingly, the state distinguisher 38 identifies the subsequent possible state signature 28 (e.g., PS2) as a second state signature.

If, on the other hand, the subsequent state signature 28 (e.g., PS2) does not differ from the first state signature 40 by at least a predetermined amount, there has not been sufficient change in the measured parameter used to create the trace 18 to designate the corresponding program as having entered a new program state. Accordingly, the state distinguisher 38 discards the possible state signature 28 (e.g., PS2), skips to the next possible state signature 28 (e.g., PS3), and repeats the process described above by comparing the first state signature 40 to the next possible state signature 28 (e.g., PS3). The state distinguisher 38 continues this process of sequentially comparing possible state signatures 28 (e.g., PS2-PSN) to the first state signature 40 until a possible state signature 28 (e.g., PS4) is identified that differs from the first state signature 40 by at least the predetermined amount. When such a possible state signature (e.g., PS4) is identified, the state distinguisher 38 designates that possible state signature (e.g., PS4) as the second state signature (e.g., State 2). All intervening possible state signatures 28 (e.g., PS2-PS3) are not used again, and, thus, may be discarded.

Once the second state (e.g., State 2) is identified, the state distinguisher 38 then begins the process of comparing the second state signature (e.g., PS4) to subsequent possible state signatures (e.g., PS5, etc.) to identify the third state (e.g., State 3) and so on until all of the possible state signatures (e.g., PS2-PSN) have been examined and, thus, all of the program states (State 1-State N) occurring during the current execution of the program have been identified. Example program states (i.e., State 2-State N) appearing after the first program state 40 are shown in FIG. 3. As shown in that example, any number of program states may occur and/or reoccur any number of times depending on the program being analyzed.

Persons of ordinary skill in the art will appreciate that there are many possible ways to compare the state signatures (e.g., State 1-State N) to subsequent possible state signatures (e.g., PS2-PSN) to determine if a new program state has been entered. Such persons will further appreciate that there are many different thresholds that may be used as the trigger for determining that a new state has been entered. The threshold chosen is a determining factor in the number and definitions of the states found in the program. In the illustrated example, the threshold difference required between signatures to declare a new program state is the Hamming distance. Thus, if the difference between a state signature (e.g., State 1) and a possible state signature (e.g., PS2) satisfies the following equation, then a new program state has been entered:

$$\Delta = |\text{State Signature XOR Possible State Signature}| / |\text{State Signature OR Possible State Signature}|$$

In other words, a new state has been entered in the example implementation if the set of bit values appearing in only one of: (a) the current state signature and (b) a possible state signature (i.e., the set of differences) divided by the set of all members appearing in either (a) the current state signature and/or (b) the possible state signature (i.e., the total set of members (e.g., logic one values appearing in the bit vectors)) is greater than a predetermined value (e.g., $\Delta$).

To manage data associated with the states identified by the state distinguisher 38, the apparatus 10 is further provided with a memory 44 (see FIG. 1). The memory 44 of the illustrated example is configured as a state array including a plurality of state data structures, wherein each data structure corresponds to a unique program state. As will be appreciated by persons of ordinary skill in the art, the state data structures and the state array 44 may be configured in any number of manners. In the illustrated example, the state array 44 is large enough to contain four hundred state data structures and each data structure in the state array includes the following fields: (a) the state signature of the corresponding program state, (b) an age of the corresponding program state, (c) a usage frequency of the corresponding program state, (d) a transitional entropy value of the corresponding state, and (e) a sub-array containing a set of probabilities of transitioning from the corresponding program state to a set of program states.

An example state data structure is shown in FIG. 5. The state signature field may be used to store the bit vector signature (e.g., State 1-State N) of the state corresponding to the data structure. The age field may be used to store a value indicative of the time at which the corresponding state was last entered. Because the state array is finite, the age field may be used as a vehicle to identify stale state data structures that may be overwritten to store data for a more recently occurring state data structure. The usage frequency field may be used to store data identifying the number of times the corresponding state has been entered during the lifetime of the data structure. The transitional entropy value field may be used to store data that may be used to identify the end of a phase and/or the end of a macroscopic transaction. The set of probabilities sub-array may be used to store data indicating the percentage of times program execution has entered program states from the program state corresponding to the state data structure during the lifetime of the state data structure. For example, each data structure may store up to sixteen sets of three fields containing data indicating a name of a program state to which the program state corresponding to the state data structure has transitioned in the past, the relative time(s) at which those transitions have occurred, and the percentage of times that the program state corresponding to the state data structure has transitioned to the state identified in the first field of the set of fields.

In order to determine transitional entropy values associated with the program states identified by the state identifier, the apparatus 10 is further provided with a predictor 46. As explained below, in the illustrated example, the predictor 46 uses the transitional entropy values to identify an end of a phase and/or the end of a macroscopic transaction.

Figure 6:
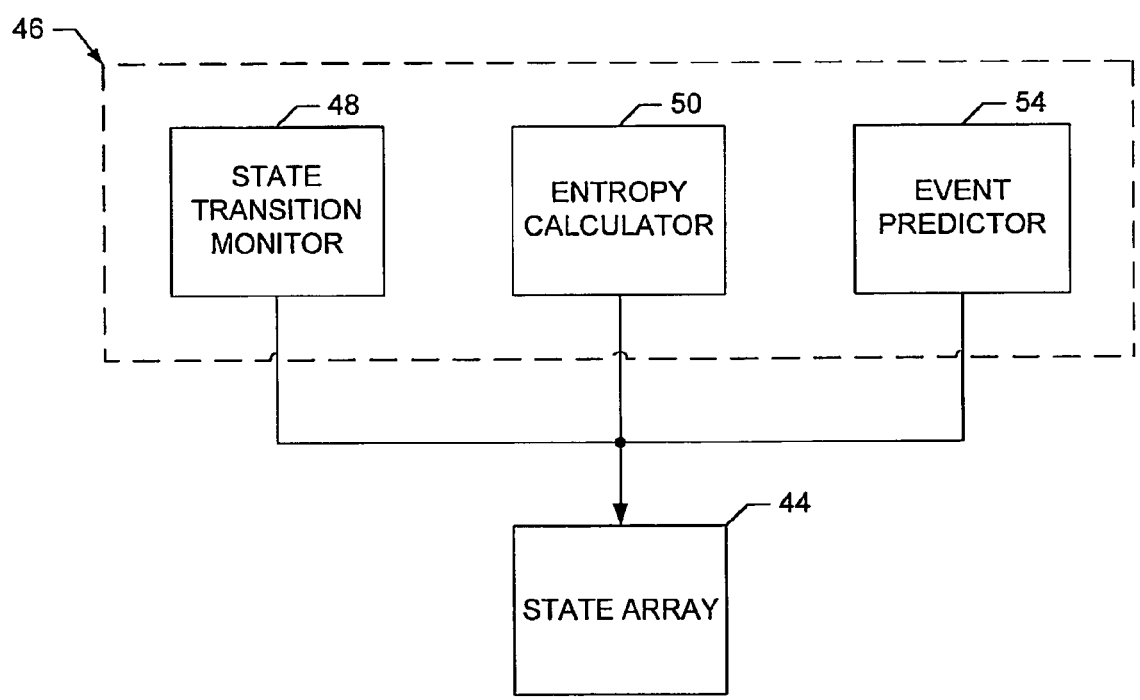
FIG. 6 is a more detailed schematic illustration of the example predictor of FIG. 1.

An example predictor 46 is shown in greater detail in FIG. 6. To calculate probabilities of transitioning from one of the program states to another of the program states, the predictor 46 is provided with a state transition monitor 48. Whenever a program state transition occurs (i.e., whenever the state of the program changes from one state to another), the state transition monitor 48 records the event in the sub-array of the state data structure corresponding to the program state that is being exited. In particular, the state transition monitor 48 records data indicating the name of the array transitioned to and the time (or a proxy for the time) at which the transition occurred. The time (or a proxy for the time) at which the transition occurred is recorded because, in the illustrated example, the state transition monitor 48 calculates the probabilities as exponential moving averages. Thus, instead of merely averaging the entries in the sub-array of the state data structure to calculate the probabilities of transitioning between specific states based on past performance, the state transition monitor 48 weights the entries in the sub-array of the state data structure based on their relative times of occurrence by multiplying those entries by an exponential function. As a result of this approach, entries in the sub-array which occur later in time have greater weight on the probability calculations than entries which occur earlier in time, and the state transition monitor 48 can, thus, identify changing patterns in the probabilities more quickly than an approach using straight moving averages.

To convert the probabilities calculated by the state transition monitor 48 into program state or transitional entropy values, the apparatus 10 is further provided with an entropy calculator 50. The transitional entropy value of a given state is the transitional uncertainty associated with that state. In other words, given the past history of a current state, the transitional entropy value quantifies the informational uncertainty as to which program state will occur when the current program state ends. For instance, for a given program state that has a past history of transitioning to a second program state and a third program state, the entropy calculator 50 converts the probabilities to transitional entropy values for the given program state by calculating a sum of (1) a product of (a) a probability of transitioning from the subject program state to the second program state and (b) a logarithm of the probability of transitioning from the subject program state to the second program state, and (2) a product of (a) a probability of transitioning from the subject program state to the third program state and (b) a logarithm of the probability of transitioning from the subject program state to the third program state. Stated another way, for each state data structure in the state array 44, the entropy converter 50 calculates a transitional entropy value in accordance with the well known Shannon formula:

$$H = -K\Sigma(Pi * \log Pi),$$

where H is the transitional entropy value, K is a constant and Pi is the probability of transitioning from the current state (i.e., the state associated with the state data structure) to state "i" (i.e., the states identified in the sub-array of the data structure of the current state). The transitional entropy value of each state identified in the executing program is stored in the data structure of the corresponding state (see FIG. 5).

In order to predict the next probable program state to be transitioned to from the current state, the predictor 46 further includes an event predictor 54. The event predictor 54 compares the probabilities appearing in the sub-array of the data structure of the current program state to determine the next most probable state or states. The next most probable state(s) are the state(s) that have the highest probability values.

The event predictor 54 also functions to identify an end of a phase and/or an end of a macroscopic transaction based on the transitional entropy value associated with the current program state. Viewed from a macroscopic application logic level, one can observe a link to the calculated transitional entropy value (H), which is a microscopic trace property. When a new business transaction starts, program execution typically follows a relatively well-defined trajectory with low transitional entropy. However, as program execution reaches the last program state in a macroscopic transaction, the transitional entropy value spikes as there is maximum uncertainty about the possible next program state to which the program will transition. In other words, within a macroscopic transaction, there are typically repetitive sequences of program states. By observing past behavior between program states, one can detect these patterns and use them to predict future behavior. In contrast, the order of macroscopic transactions has a higher degree of randomness than the order of program states within a macroscopic transaction because the order in which macroscopic transactions are executed depends on the order in which requests for transactions are received from third parties and is, thus, substantially random.

To make this point clearer, consider an on-line retailer. The server of the on-line retailer receives requests from a number of different customers and serializes those requests in a generally random fashion in a queue. The order in which the requests are handled is, thus, random. However, once the server begins serving a request, it will generally process the entire transaction before serving another transaction from the queue. As a result, the program state at the end of a macroscopic transaction typically has a high transitional entropy value (i.e., there is a high level of uncertainty as to which program state will be entered), because there is a high level of uncertainty as to which macroscopic transaction will follow the current macroscopic transaction that just completed execution. Consequently, the last program state in a macroscopic transaction is characterized by a spike in its transitional entropy value relative to the surrounding transitional entropy values. In other words, the transitional entropy value of the last program state of a macroscopic transaction is typically a relative maximum as compared to the transitional entropy values of the program states immediately proceeding and following the last program state. A similar spike, though perhaps not as drastic, may occur at the end of a program phase within a macroscopic transaction having multiple phases.

The event predictor 54 takes advantage of this characteristic by using this transitional entropy spike as a demarcation mark for the end of a phase and/or the end of a macroscopic transaction. A phase and/or a macroscopic transaction may thus be defined as an ordered sequence of program states with a transitional entropy-spiking ending state. A macroscopic transaction maps to a business or application software transaction, which is an intrinsic property of a workload. The same macroscopic transaction may contain different sets of program states, which are measurement-dependent properties of a workload that can be tuned through the transition threshold value. One caution, however, is that repeatable sub-transactions (i.e., program phases) that may not be significant to high level business logic may also end at a program state exhibiting a spiking transitional entropy value and, thus, may be mis-identified as a macroscopic transaction. This mis-identification is not a problem in practical cases such as performance tuning of a program because sub-transactions with large transitional uncertainty behave like transactions for all practical purposes.

As stated above, the event predictor 54 identifies a spike in the transitional entropy values of a series of program states as an end of a phase and/or the end of a macroscopic transaction. Persons of ordinary skill in the art will appreciate that the event predictor 54 may use any number of techniques to identify a spike in the transitional entropy values. For example, the event predictor 54 may compare the transitional entropy value of the current state to the transitional entropy value of the previous state and the transitional entropy value of the following state. If the transitional entropy value of the current state exceeds the transitional entropy value of the previous state and the transitional entropy value of the following state, the transitional entropy value of the current state is a relative maximum (i.e., a spike) and the current state is identified as the end of a phase or macroscopic transaction. Otherwise, it is not a relative maximum and the current state is not identified as the end of a phase or the end of a macroscopic transaction.

Figure 7:
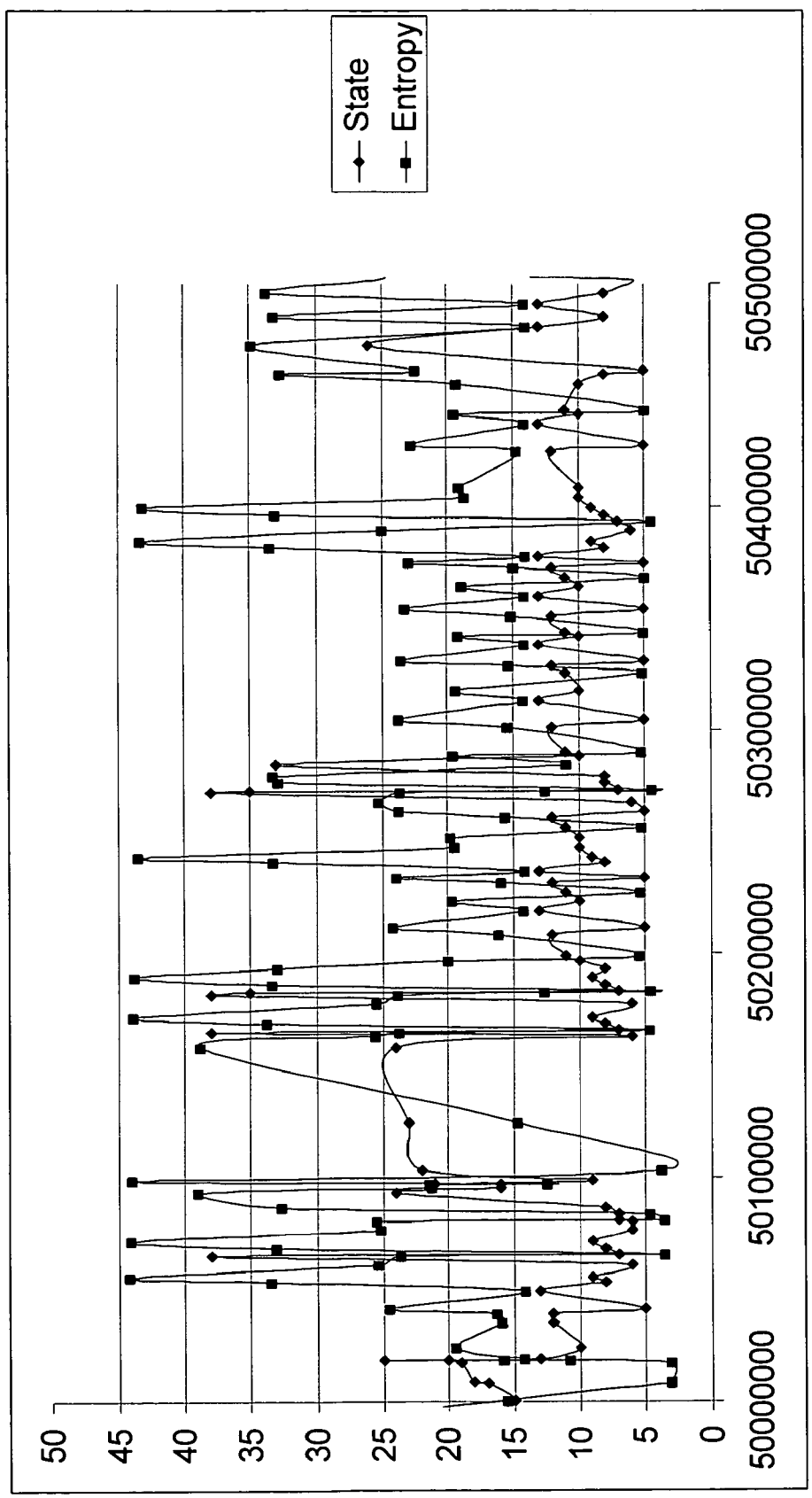
FIG. 7 is a chart graphing example transitional entropy values calculated by the entropy calculator of FIG. 6.

A chart illustrating a graph of example transitional entropy values calculated by the entropy calculator 50 is shown in FIG. 7. In the chart of FIG. 7, instead of using the signatures to index the program states, we use the first discovery time of each program state as its unique index. These first discovery times are used as the ordinates of the Y-axis in FIG. 7. (The ordinates of the Y-axis also represent transitional entropy values as explained below.) Memory accesses are used as the ordinates of the X-axis of FIG. 7. The memory accesses are a proxy to time.

The chart of FIG. 7 includes two graphs. One of the graphs represents the program states that are entered over the time period at issue. The other graph represents the transitional entropy values of the corresponding program states over that same time period. As can be seen by examining FIG. 7, each state in the graph (i.e., each data point represented by a diamond ♦) is positioned in vertical alignment with its corresponding transitional entropy value (i.e., each data point represented by a square ■). As can also be seen in FIG. 7, the transitional entropy values spike periodically. Each of these spikes in the transitional entropy values represents an end of a phase and/or an end of a macroscopic transaction.

Flowcharts representative of example machine readable instructions for implementing the apparatus 10 of FIG. 1 are shown in FIGS. 8 and 9A-9C. In this example, the machine readable instructions comprise a program for execution by a processor such as the processor 1012 shown in the example computer 1000 discussed below in connection with FIG. 10. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the trace sampler 12, the state identifier 14, the predictor 46, the weight assigning engine 34, the signature developer 16, the state distinguisher 38, the state transition monitor 48, the entropy calculator 50, and/or the event predictor 54 could be implemented by software, hardware, and/or firmware. Further, although the example program is described with reference to the flowcharts illustrated in FIGS. 8 and 9A-9C, persons of ordinary skill in the art will readily appreciate that many other methods of implementing the example apparatus 10 may alternatively be used. For example, the order of execution of the blocks may be changed, and/or some of the blocks described may be changed, eliminated, or combined.

Figure 8:
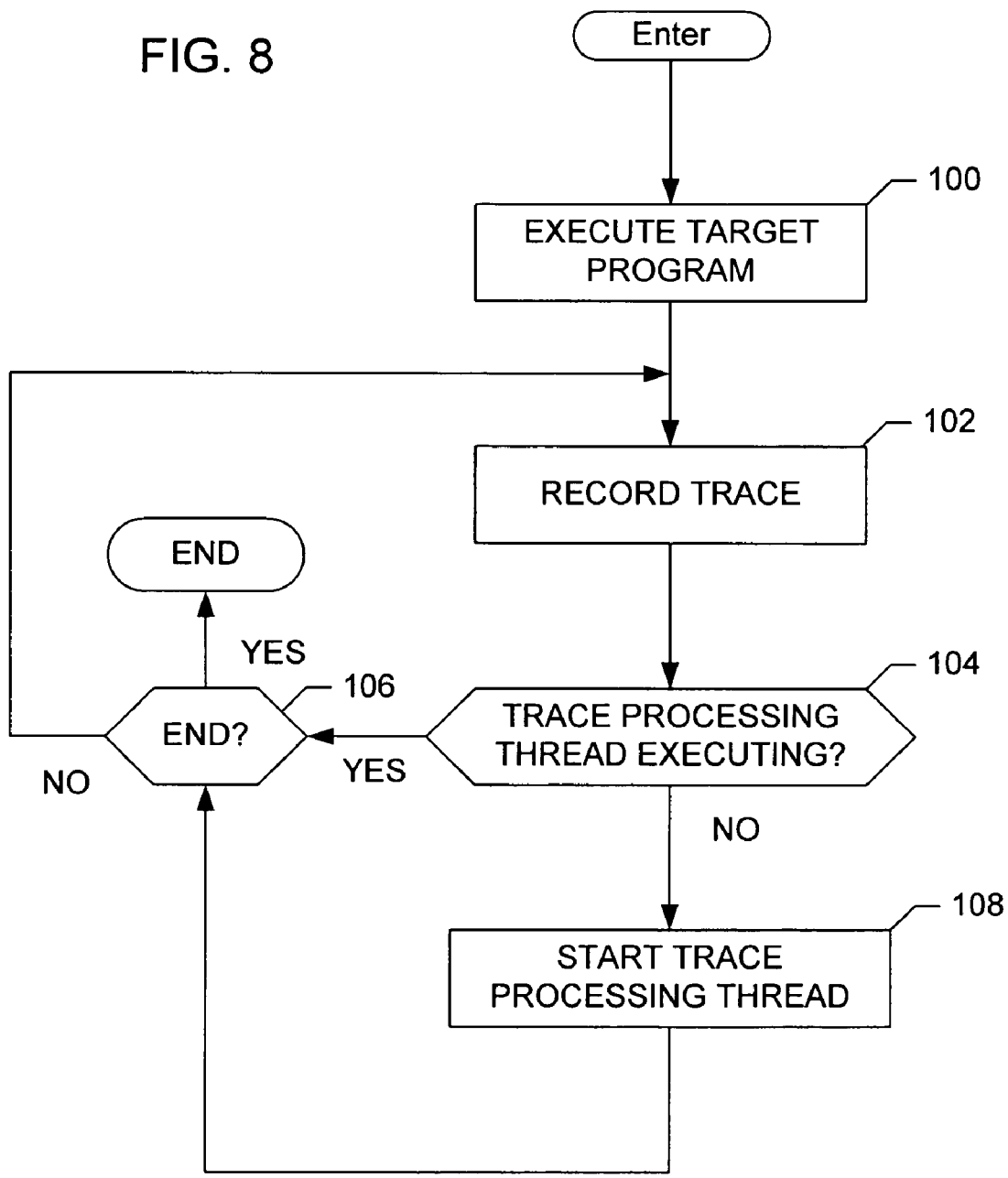
FIG. 8 is a flow chart illustrating example machine readable instructions for implementing the trace sampler of the apparatus of FIG. 1.

The program of FIG. 8 begins at block 100 where the target program begins execution. While the target program executes, the trace sampler 12 creates one or more traces 18 of one or more properties of the executing program (block 102). For example, the trace sampler 12 may generate an instruction address trace, a memory address trace, a basic block trace, and/or any other type of trace. Control proceeds from block 102 to block 104.

If a trace processing thread has already been invoked (block 104), control proceeds from block 104 to block 106. If the trace 18 of the program is complete (block 106), the program of FIG. 8 terminates. Otherwise, if the trace 18 of the program is not complete (block 106), control returns to block 102 where the recording of the trace 18 continues.

If the trace processing thread has not already been invoked (block 104), control proceeds to block 108. At block 108, the trace processing thread is initiated. Control then returns to block 106. As explained above, the program will terminate if the trace 18 is complete (block 106) or continue to generate the trace 18 (block 102) if the trace 18 has not yet been completed. Thus, control continues to loop through blocks 100-108 until the target program stops executing and the trace 18 is complete.

Figure 9A:
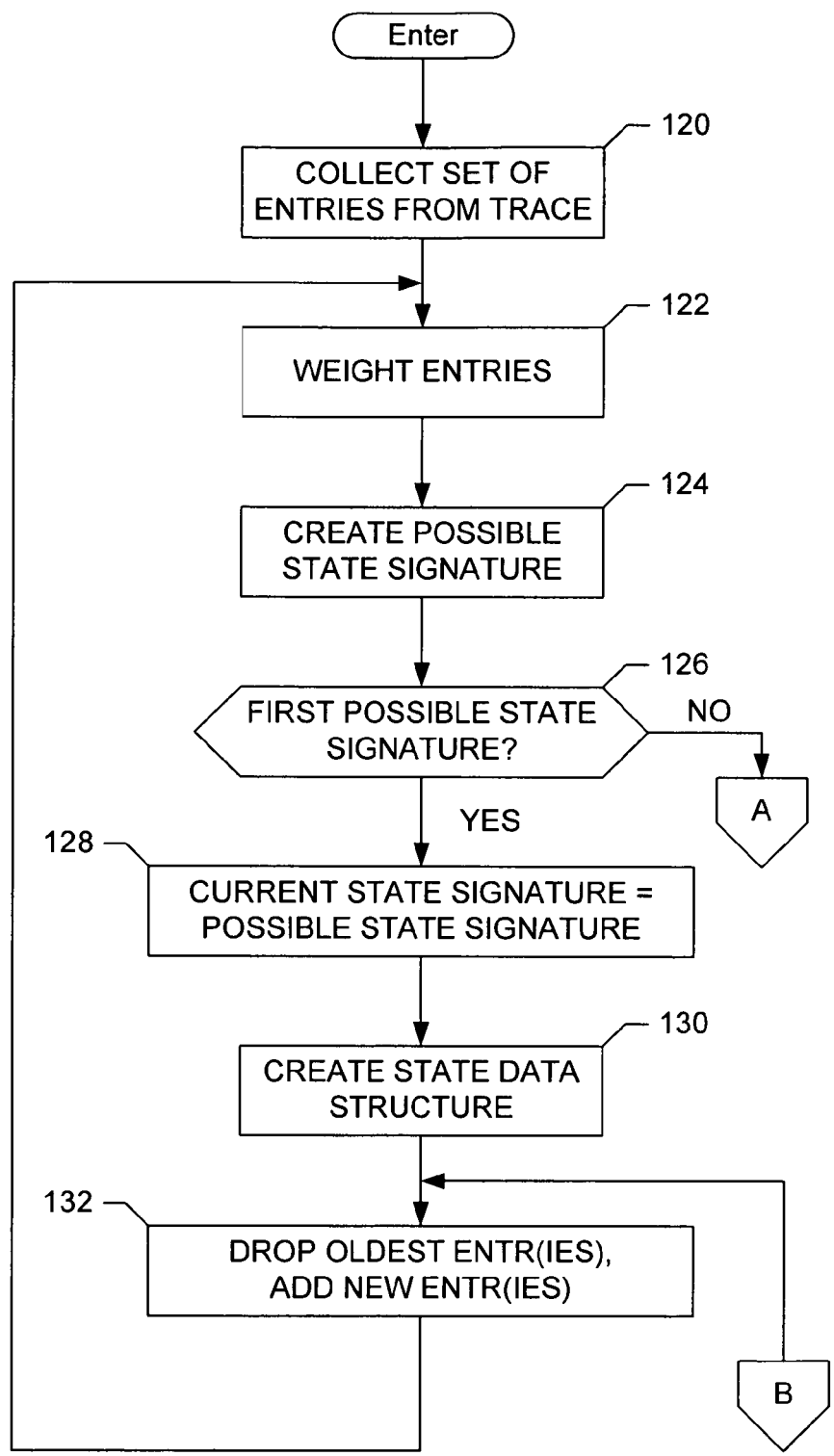
FIGS. 9A-9C are flowcharts illustrating example machine readable instructions for implementing the state identifier and predictor of the apparatus of FIG. 1.
Figure 9B:
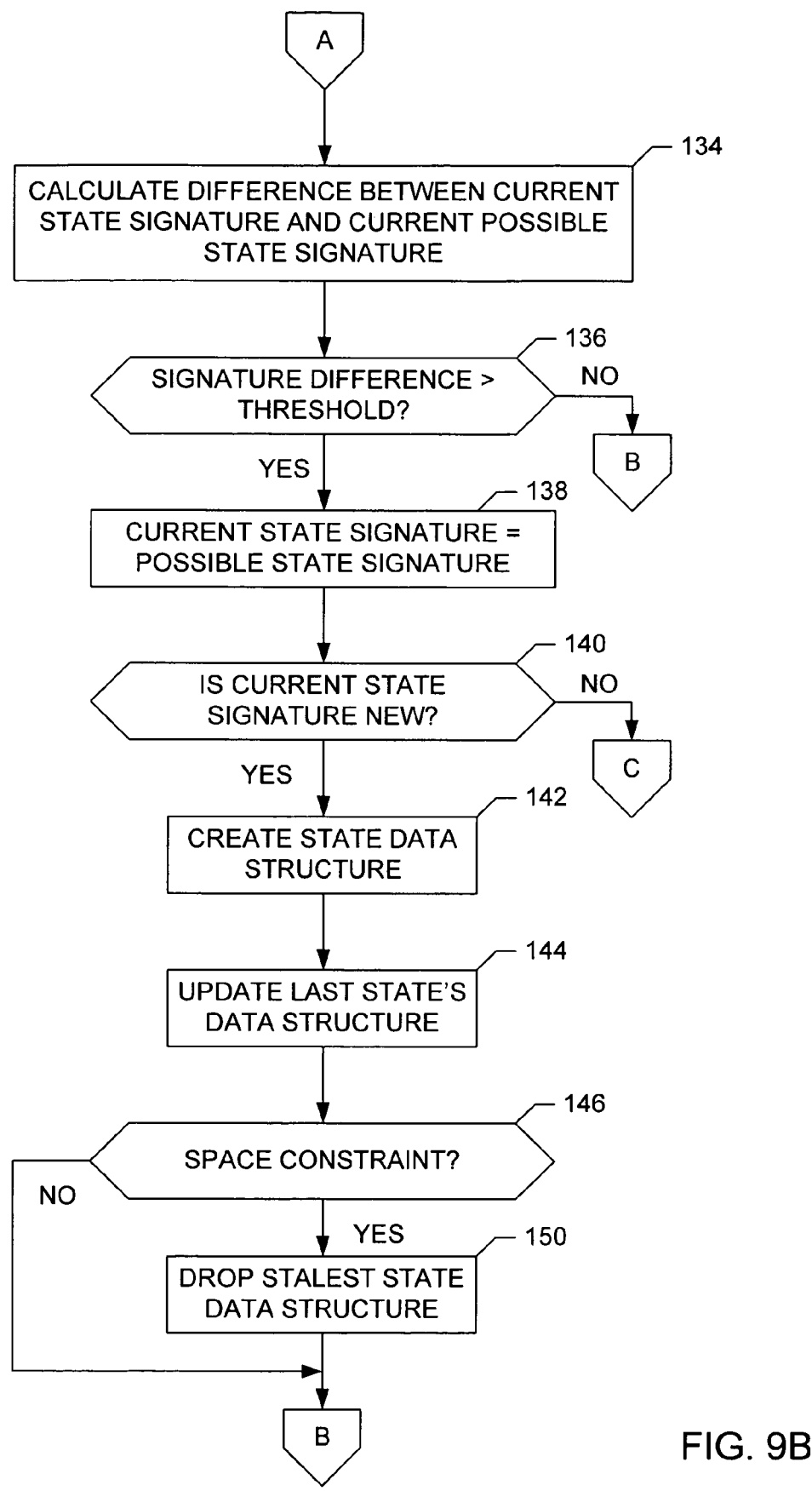
Figure 9C:
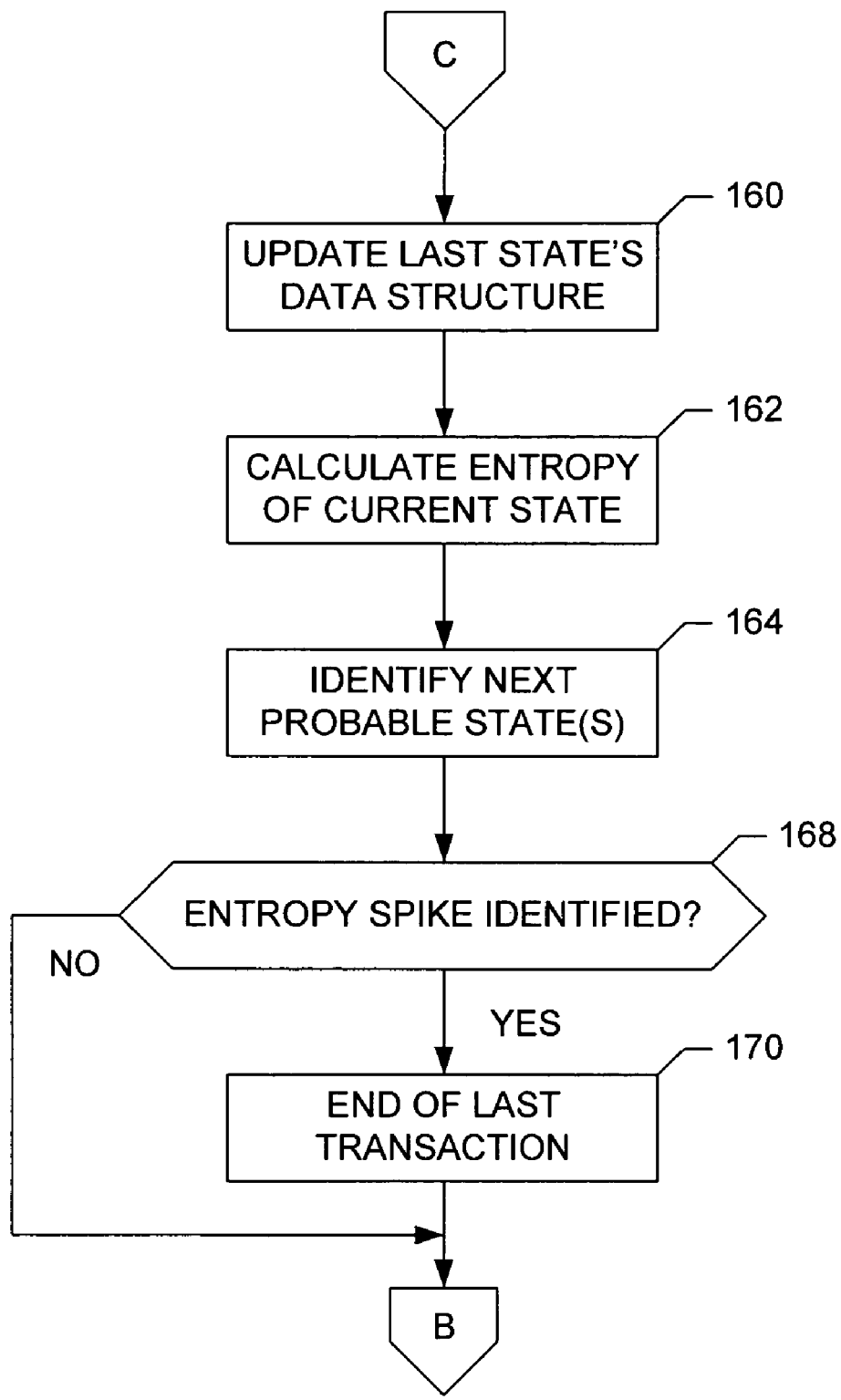

An example trace processing thread is shown in FIGS. 9A-9C. The illustrated trace processing thread begins at block 120 where the signature developer 16 obtains a set 26 of entries from the trace 18 created by the trace sampler 12. As explained above, the sets 26 of entries may be created in any number of ways to include any number of members. In the example of FIG. 3, each of the sets 26 include a series of sequential entries (i.e., no entries are skipped), and adjacent sets overlap (i.e., at least one of the entries is used in two adjacent sets. However, sets which skip some entries in the trace 18 and/or which do not overlap could alternatively be employed.

Once the entries to create a set 26 are retrieved from the trace 18 (block 120), the weight assigning engine 39 adjusts the values of the retrieved entries such that later entries are given greater weight than earlier entries (block 122). For example, the weight assigning engine 34 may apply an exponential decay function 36 (e.g., $f_1 = e^{-t/T}$) to the entries in the set (block 122).

Once the values of the entries have been weighted by the weight assigning engine 34 (block 122), the signature developer 16 maps the entries in the set 26 to an n-bit vector to create a possible state signature 28 for the set 26 (block 124). As explained above, the mapping of the entries in the set 26 to the possible state signature 28 may be performed using a hashing function.

After the possible state signature 28 is generated (block 124), the state distinguisher 38 determines whether the possible state signature 28 is the first possible state signature (block 126). If it is the first possible state signature (block 126), the first possible state signature is, by default, defined to be the first state signature. Thus, the state distinguisher 38 sets a current state signature variable equal to the possible state signature 28 (block 128) and creates a state data structure in the state array 44 for the first state (block 130). An example state data structure is shown in FIG. 5. The state distinguisher 38 may create the state data structure by creating the fields shown in FIG. 5, by writing the current state signature into the state signature field of the new state data structure, by setting the age field of the new state data structure equal to the current time or a proxy for the current time, and by setting the transitional entropy field and the probability sub-array fields equal to zero.

The signature developer 16 then collects the next set 26 of entries for creation of a possible state signature 28 (block 132). In the illustrated example, the sets 26 used by the signature developer 16 to create the possible signatures 28 are overlapping. Thus, the signature developer 16 may create the next set 26 of entries by dropping the oldest entr(ies) from the last set 26 of entries and adding a like number of new entr(ies) to create a new current set 26 (block 132). Control then returns to block 122 where the entries in the new current set are weighted as explained above.

When at block 126, the current possible state signature is not the first possible state signature, control will skip from block 126 to block 134 (FIG. 9B). At block 134, the state distinguisher 38 calculates the difference between the current state signature (i.e., the value in the current state signature variable mentioned above), and the current possible state signature. The state distinguisher 38 then compares the computed difference to a threshold (e.g., the Hamming difference). If the computed difference exceeds the threshold (block 136), a program state change has occurred and control proceeds to block 138. If the computed difference does not exceed the threshold (block 136), the signature developer 16 collects the next set 26 of entries for creation of a possible state signature 28 (block 132, FIG. 9A) and control returns to block 122 as explained above. Thus, control continues to loop through blocks 122-136 until a program state change occurs.

Assuming for purposes of discussion that a program state change has occurred (block 136), the state distinguisher 38 sets the current state signature variable equal to the current possible state signature 28 (block 138). The state distinguisher 38 then examines the signatures present in the state array 44 to determine if the current state signature corresponds to the signature of a known state (block 140). If the current state signature is a known state signature, control advances to block 160 (FIG. 9C). Otherwise, if the current state signature is not a known state signature (i.e., the current state signature does not correspond to a state already existing in the state array 44), control advances to block 142 (FIG. 9B).

Assuming for purposes of discussion that the current state signature is not a known state signature (e.g., the current program state is a new program state) (block 140), the state distinguisher 38 creates a state data structure in the state array 44 for the first state (block 142) as explained above in connection with block 130.

The state transition monitor 48 then updates the last state's probability sub-array to reflect the transition from the last state to the new current state (block 144). Control then proceeds to block 146 where the state distinguisher 38 determines if the state array 44 has become full (i.e., if the newly added data structure used the last available spot in the state array). If the state array 44 is not full, control returns to block 132 (FIG. 9A) where the signature developer 16 collects the next set 26 of entries for creation of a possible state signature 28. Control then returns to block 122 as explained above.

If the state array is full (block 146), control advances to block 150 (FIG. 9B) where the state distinguisher 38 deletes the stalest state data structure from the state array 44. The stalest state data structure may be identified by comparing the usage fields of the state data structures appearing in the state array 44. Once the stalest state data structure is eliminated (block 150), control advances to block 132 where the signature developer 16 collects the next set 26 of entries for creation of a possible state signature 28. Control then returns to block 122 as explained above.

Assuming that the current state signature is a known state signature (block 140), control proceeds to block 160 (FIG. 9C). The state transition monitor 48 then updates the last state's probability sub-array to reflect the transition from the last state to the new current state (block 160). Control then proceeds to block 162 where the entropy calculator 50 calculates the transitional entropy value of the current state. As explained above, the transitional entropy value may be calculated in many different ways. For instance, in the illustrated example, the transitional entropy value is calculated using the Shannon formula.

Once the transitional entropy value is calculated (block 162), the event predictor 54 identifies the next most probable state(s) (block 164) by, for example, comparing the values in the probability sub-array of the state data structure of the current state. The event predictor 54 may then examine the transitional entropy values of the last few states to determine if a transitional entropy spike has occurred (block 168). If an entropy spike is identified (block 168), the event predictor 54 identifies the program state corresponding to the transitional entropy spike as the last state of a phase or a macroscopic transaction (block 170). If an entropy spike is not identified (block 168), neither the end of a phase nor the end of a macroscopic transaction has occurred. Accordingly, control skips block 170 and returns to block 132 (FIG. 9A).

Irrespective of whether control reaches block 132 via block 170 or directly from block 168, at block 132 the signature developer 16 collects the next set 26 of entries for creation of a possible state signature 28. Control then returns to block 122 as explained above. Control continues to loop through blocks 122-170 until the entire trace 18 has been processed. Once the entire trace 18 has been processed, the trace processing thread of FIGS. 9A-9C terminates.

Persons of ordinary skill in the art will readily appreciate that the above described program state identification framework may be employed (in some cases, with modifications) to achieve various performance enhancements. For example, the above described framework may be modified to detect program state execution patterns and to leverage those patterns to achieve more efficient memory usage. To further elucidate this point, an example apparatus 300 to prefetch memory objects to reduce cache misses is shown in FIG. 10.

Figure 10:
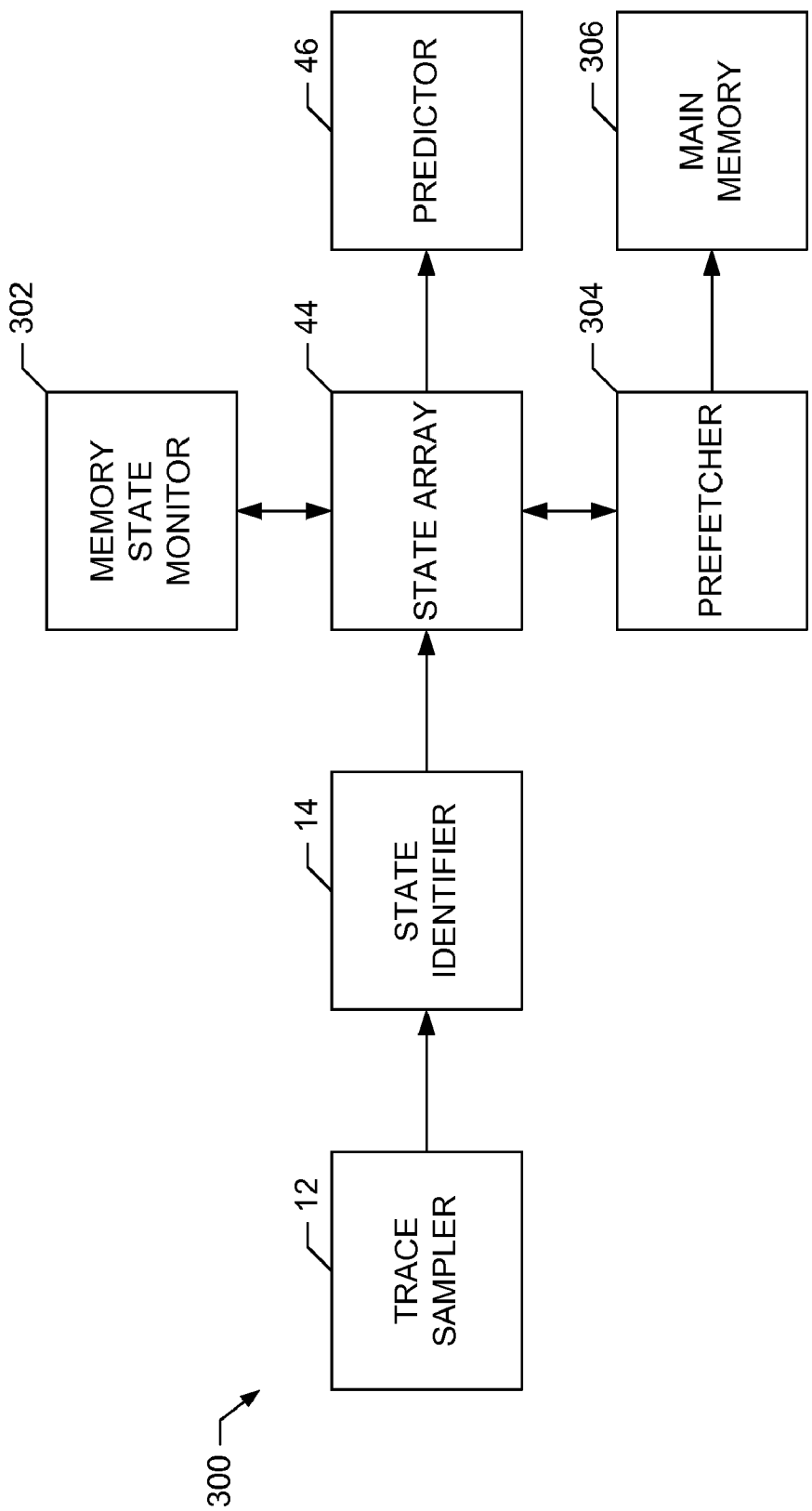
FIG. 10 is a schematic illustration of an example apparatus to prefetch memory objects.

The example apparatus 300 of FIG. 10 utilizes some of the same structures as the apparatus 10 of FIG. 1. Indeed, the illustrated apparatus 300 incorporates all of the structures of the apparatus of FIG. 1 (as shown in FIG. 10 by the structures bearing the same names and/or reference numbers as the corresponding structures in FIG. 1), and adds other structures to perform additional functionality. However, persons of ordinary skill in the art will appreciate that, if desired, structures appearing in the example apparatus 10 may be eliminated from the example apparatus 300 of FIG. 10

Since there is overlap between the structures and functionality of the example apparatus 10 and the example apparatus 300, in the interest of brevity, descriptions of the overlapping structures and functions will not be fully repeated here. Instead, the interested reader is referred to the corresponding description of the example apparatus 10 of FIG. 1 for a complete description of the similar structures appearing in the example apparatus 300 of FIG. 10. To facilitate this process, like structures are labeled with the same names and/or reference numerals in the figures and descriptions of the apparatus 10 and the apparatus 300.

Like the example apparatus 10, the example apparatus 300 includes a trace sampler 12 to develop a trace of a program of interest, and a program state identifier 14 to identify program states from the trace. It also includes a memory/state array 44 to store data structures containing data representative of the states identified by the program state identifier 14. The illustrated apparatus 300 also includes a predictor 46 to predict the next program state(s) that will likely be entered by the executing program and/or to identify the ends of program phases and/or macroscopic transactions.

In the illustrated example, rather than using instruction addresses to create an instruction trace, the trace sampler 12 of the apparatus 300 records the memory addresses (or proxies for the memory addresses) that are issued to retrieve data and/or instructions from the main memory and/or a mass storage device to the cache to create a main memory address trace. Thus, the program states identified by the state identifier 14 of the example apparatus 300 are based on a memory address trace and, consequently, are reflective of patterns in memory accesses, as opposed to patterns in instruction execution as would be the case if the program states were created based on an instruction address trace. Persons of ordinary skill in the art will appreciate, however, that other types of traces may alternatively be employed to create the trace. For example, an instruction trace may alternatively be used.

Irrespective of the type of trace created by the trace sampler 12, the state identifier 14 analyzes the trace to identify a series of program states as explained above in connection with the example apparatus 10 of FIG. 1. As in the example apparatus 10 of FIG. 1, the program states identified by the state identifier 14 are represented by state data structures stored in the memory/state array 44. As shown in the example of FIG. 11, the state data structures stored in the state array 44 may include the fields described above in connection with the example state data structure shown in FIG. 5 (e.g., state signature, age, usage frequency, transitional entropy, etc.). However, to make it possible to pre-fetch memory objects, the state data structures of FIG. 11 also include one or more fields to store memory profiles for the states identified by the state identifier 14. For example, the data structure discussed above in connection with FIG. 5 may be modified as shown in FIG. 11 to include the memory object references (or proxies for the memory object references which may be reconstructed to form the memory object references) employed to retrieve the memory objects associated with the corresponding program state. As noted above, the memory object references may be memory addresses. Thus, the memory references appended to the example data structure of FIG. 11 may comprise the portion of the memory address trace (or a reference (e.g., a link) to the portion of the memory address trace) corresponding to the subject program state.

As used herein, the term "memory reference" refers to an address (or a proxy for an address) used to retrieve a memory object from a main memory and/or a mass storage device (e.g., a compact disk, a digital versatile disk, a hard disk drive, a flash memory, etc) to the cache memory, and/or an address (or a proxy for an address) used to retrieve a memory object from a mass storage device to the main memory and/or the cache memory. As used herein, the term "memory object" refers to an instruction, part of an instruction, and/or data that is stored in at least one of a main memory, a cache memory, and a mass storage medium. Fetching or prefetching a memory object may involve retrieving a copy of the object from the main memory or mass storage medium and storing one or more copies of the object in one or more levels of the cache, and/or initializing one or more locations in the cache and/or main memory for storage of data and/or instructions.

To associate memory profiles with respective ones of the program states, the example apparatus 300 is further provided with a memory state monitor 302. The memory state monitor 302 populates the state data structures with the memory references (or proxies for the memory references) associated with the corresponding states. Because the memory references of a given state may change to some degree over the lifetime of an executing program, the memory state monitor 302 may be constructed to update the memory profiles as the program being monitored is executed. For instance, the memory state monitor 302 may be structured to filter the memory profiles by adding, deleting, and/or changing one or more of the memory references in the memory profiles to reflect the memory references most recently associated with the program states. Thus, for example, the memory state monitor 302 may be adapted to filter the memory references included in the memory profiles based on a usage filter model (e.g., the most recently used memory references are kept, while older references are discarded), or based on a miss filter model (e.g., the memory references associated with a cache miss are kept, while references associated with a cache hit are discarded). Usage filtering and/or miss filtering have the advantage of reducing the size of the stored memory profiles. For example, during testing cache miss filtering reduced the required memory data structures by half while achieving substantially the same level of cache performance benefit.

In order to retrieve memory objects that are expected to be used in the near future from a main memory 306 and/or a mass storage device to a cache, the apparatus 300 is further provided with a prefetcher 304. The prefetcher 304 may use any number of strategies as to which memory references should be prefetched at a particular time. For example, the prefetcher 304 may be structured to retrieve the memory references associated with the next most probable state, all of the next probable states, or a subset of the next probable states. The next most probable state(s) are identified by the predictor 46 by reviewing the probabilities appearing in the sub-array of the data structure of the current program state as explained above in connection with the apparatus 10. The prefetcher 304 may identify the memory references required to prefetch the memory objects associated with the next most probable state(s) identified by the predictor 46 from the memory profile(s) stored in the state data structure(s) of the next most probable state(s) by the memory state monitor 302.

The prefetcher 304 may always retrieve the memory references of the next most probably state or a plurality of the next most probable state(s). Alternatively, the prefetcher 304 may employ the transitional entropy values developed by the predictor 46 to determine the amount of prefetching to be performed. For example, if the transitional entropy value of the current state exceeds a predetermined threshold, there may be so much uncertainty as to the next state that prefetching memory objects may be more likely to pollute the cache then to expedite execution. Accordingly, if the transitional entropy value is sufficiently high, the prefetcher 304 may be adapted to not prefetch any memory objects.

Additionally or alternatively, the prefetcher 304 may be structured to prefetch a different amount of memory objects for different levels of transitional entropy values. For example, if the transitional entropy value of a current program state is less than a predetermined threshold, the prefetcher 304 may prefetch the memory objects associated with a next most probable state. If, on the other hand, the transitional entropy value of the current program state is greater than the same or a different predetermined threshold, the prefetcher 304 may prefetch the memory objects associated with a plurality of next most probable states.

Irrespective of the prefetching strategy employed, it is important to properly time the occurrence of the prefetching operation. If the prefetching operation is performed too early, the prefetched content may be polluted (e.g., destroyed) before they are used and, thus, the prefetched objects may be unavailable when they are needed. On the other hand, if the prefetching operation is performed too late, the prefetched memory objects may not have reached the cache by the time they are needed. To address this timing concern, the illustrated apparatus 300 performs the prefetching operation near the beginning of a current program state, and the programs states are defined to have a duration that exceeds the latency of the memory 306, but is not long enough to allow the prefetched objects to be polluted before they are needed. To define the program states to have durations meeting these criteria, it may be necessary to tune the threshold difference required between signatures for the state identifier 14 to declare a new program state. Typically, the program states have a duration of a few thousand instructions, which provides sufficient time to prefetch memory objects without causing cache pollution.

Figure 12:
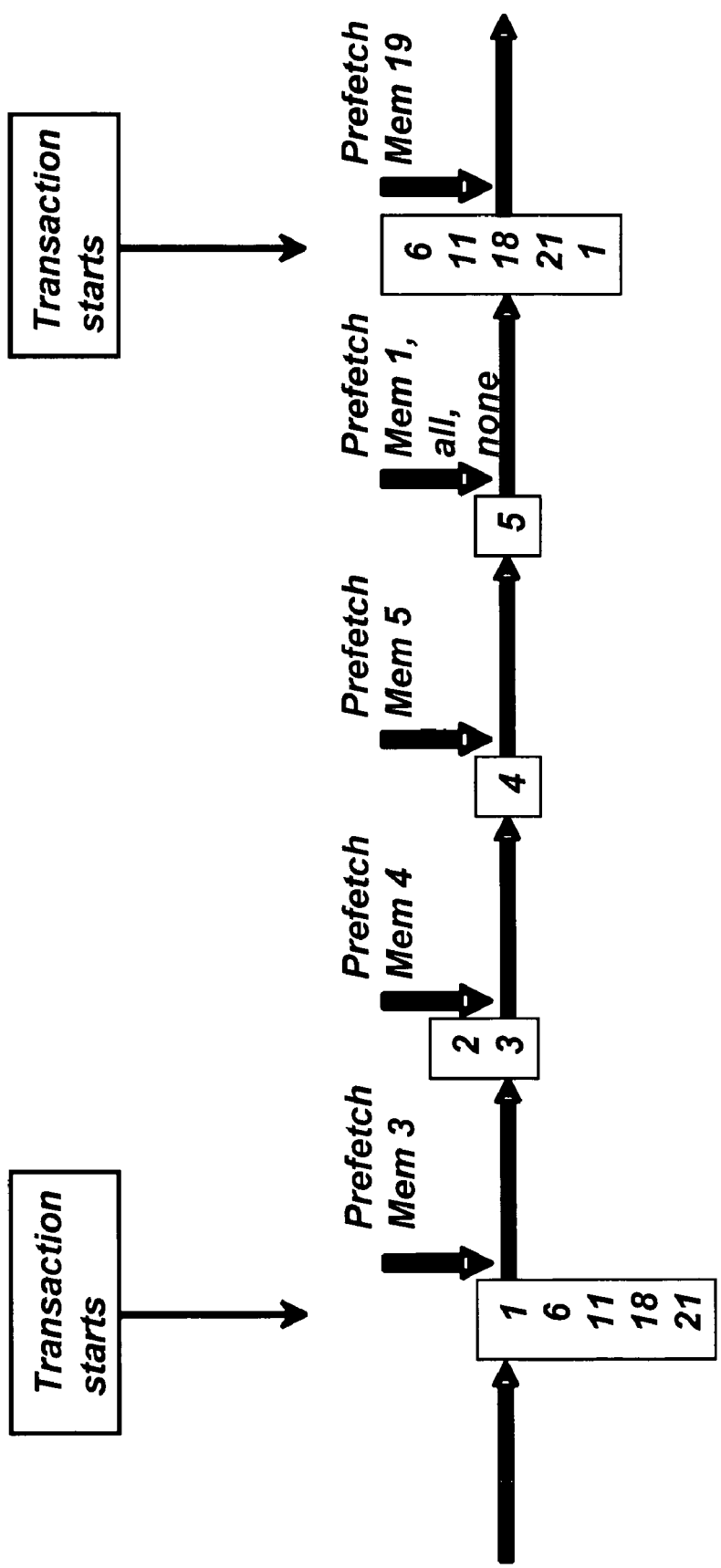
FIG. 12 is a schematic illustration of an example program execution path.

An example program execution path illustrating the operation of the example apparatus 300 is shown in FIG. 12. The example of FIG. 12 begins at the start of a macroscopic transaction. At the beginning of that transaction, program state 1 was entered out of a set of probable program states (i.e., states 1, 6, 11, 18 and 21). Upon reviewing the sub-array of the data structure of the current program state, the predictor 46 determines that the next possible states are states 2 and 3, and that state 3 is the next most probable state. (The fact that there are two possible next states illustrates intra-transactional variance.) In the illustrated example, the prefetcher 304 is structured to prefetch the memory references associated with the next most probable state unless the transitional entropy value associated with the current state exceeds a predetermined value. If the transitional entropy value exceeds that threshold, the prefetcher 304 does not prefetch any memory objects.

In the example of FIG. 12, the transitional entropy value of the current state (i.e., state 1) is sufficiently low to enable prefetching. Accordingly, the prefetcher 304 retrieves the memory profile associated with state 3 from the corresponding state data structure and retrieves the memory objects addressed by the retrieved memory references. The predictor 46 then accesses the sub-array of the data structure associated with state 3 and determines that, based on past performance, the next state (i.e., state 4) is 100% deterministic. Thus, prefetching will be highly effective and the prefetcher 304 accesses the memory profile of state 4 and uses the memory references from that profile to prefetch the memory objects associated with state 4. In the example of FIG. 12, the predictor 46 then determines that, again based on past performance, the next state (i.e., state 5) is also 100% deterministic. Accordingly, the prefetcher 304 accesses the memory profile of state 5 and uses the memory references from that profile to prefetch the memory objects associated with state 5.

In the example of FIG. 12, state 5 marks the end of the macroscopic transaction and, thus, has a high transitional entropy value. Accordingly, the next program state may not be predicted with a high degree of certainty. As explained above, depending on the prefetching strategy selected, the prefetcher 304 may respond to the occurrence of a state with a high transitional entropy value in any number of ways. For example, it may prefetch some, none or all of the next possible states.

Irrespective of the prefetching strategy chosen, program execution continues. In the example of FIG. 12 program execution proceeds from state 5 to state 18, which marks the start of a new macroscopic transaction. Upon entering state 18, the predictor 46 and the prefetcher 304 operate as explained above to predict the next most probable state(s) (e.g., state 19) and to prefetch some, all or none of the memory objects associated with those state(s) depending on the prefetching strategy and, possibly, the transitional entropy value of the current state.

Flowcharts representative of example machine readable instructions for implementing the apparatus 300 of FIG. 10 are shown in FIGS. 8, 13A-13C, 14 and/or 15. In this example, the machine readable instructions comprise a program for execution by a processor such as the processor 1012 shown in the example computer 1000 discussed below in connection with FIG. 16. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the trace sampler 12, the state identifier 14, the predictor 46, the memory state monitor 302 and/or the prefetcher 304 could be implemented by software, hardware, and/or firmware. Further, although the example program is described with reference to the flowcharts illustrated in FIGS. 8, 13A-13C, 14 and/or 15, persons of ordinary skill in the art will readily appreciate that many other methods of implementing the example apparatus 300 may alternatively be used. For example, the order of execution of the blocks may be changed, and/or some of the blocks described may be changed, eliminated, or combined.

Since, as explained above, some of the structures of the example apparatus 10 are substantially identical to structures of the example apparatus 300, if those overlapping structures are implemented via software and/or firmware, they may be implemented by similar programs. Thus, for example, the trace sampler 12, the state identifier 14 and the predictor 46 may be implemented in the example apparatus 300 using substantially the same machine readable instructions described above in connection with FIGS. 8 and 9A-9C. In the interest of brevity, the blocks of the program used to implement the apparatus 300 which are the same or substantially the same as the blocks of the program used to implement the apparatus 10, will be described in abbreviated form here. The interested reader is referred to the above description for a full description of those blocks. To facilitate this process, like blocks are labeled with like reference numerals in FIGS. 9A-9C and 13A-13C.

As mentioned above, the trace sampler 12 is implemented by substantially the same machine readable instructions in the apparatus 300 as in the apparatus 10. Thus, the above-description of blocks 100-108 applies to both the example apparatus 10 and the apparatus 300, except that in the apparatus 300, the trace sampler 12 generates a memory address trace. The program of FIG. 8 begins at block 100 where the target program begins execution. While the target program executes, the trace sampler 12 creates a memory address trace (block 102). Control proceeds from block 102 to block 104.

If a trace processing thread has already been invoked (block 104), control proceeds from block 104 to block 106. If the trace 18 of the program is complete (block 106), the program of FIG. 8 terminates. Otherwise, if the trace 18 of the program is not complete (block 106), control returns to block 102 where the recording of the trace 18 continues.

If the trace processing thread has not already been invoked (block 104), control proceeds to block 108. At block 108, the trace processing thread is initiated. Control then proceeds to block 106. Control continues to loop through blocks 100-108 until the target program stops executing and the trace 18 is complete.

Once a trace processing thread is spawned (block 108, FIG. 8), the illustrated trace processing thread begins at block 120 (FIG. 13A) where the signature developer 16 obtains a set 26 of entries from the trace 18 created by the trace sampler 12. Once the entries to create a set 26 are retrieved from the trace 18 (block 120), the weight assigning engine 34 adjusts the values of the retrieved entries such that later entries are given greater weight than earlier entries (block 122). Once the values of the entries have been weighted by the weight assigning engine 34 (block 122), the signature developer 16 maps the entries in the set 26 to an n-bit vector to create a possible state signature 28 for the set 26 (block 124). After the possible state signature 28 is generated (block 124), the state distinguisher 38 determines whether the possible state signature 28 is the first possible state signature (block 126). If it is the first possible state signature (block 126), the first possible state signature is, by default, defined to be the first state signature. Thus, the state distinguisher 38 sets a current state signature variable equal to the possible state signature 28 (block 128) and creates a state data structure in the state array 44 for the first state (block 130). The memory state monitor 302 then writes the memory references of the memory profile associated with the current state in the state data structure (block 331).

The signature developer 16 then collects the next set 26 of entries for creation of a possible state signature 28 (block 132). In the illustrated example, the sets 26 used by the signature developer 16 to create the possible signatures 28 are overlapping. Thus, the signature developer 16 may create the next set 26 of entries by dropping the oldest entr(ies) from the last set 26 of entries and adding a like number of new entr(ies) to create a new current set 26 (block 132). Control then returns to block 122 (FIG. 13A) where the entries in the new current set are weighted as explained above.

Figure 13A:
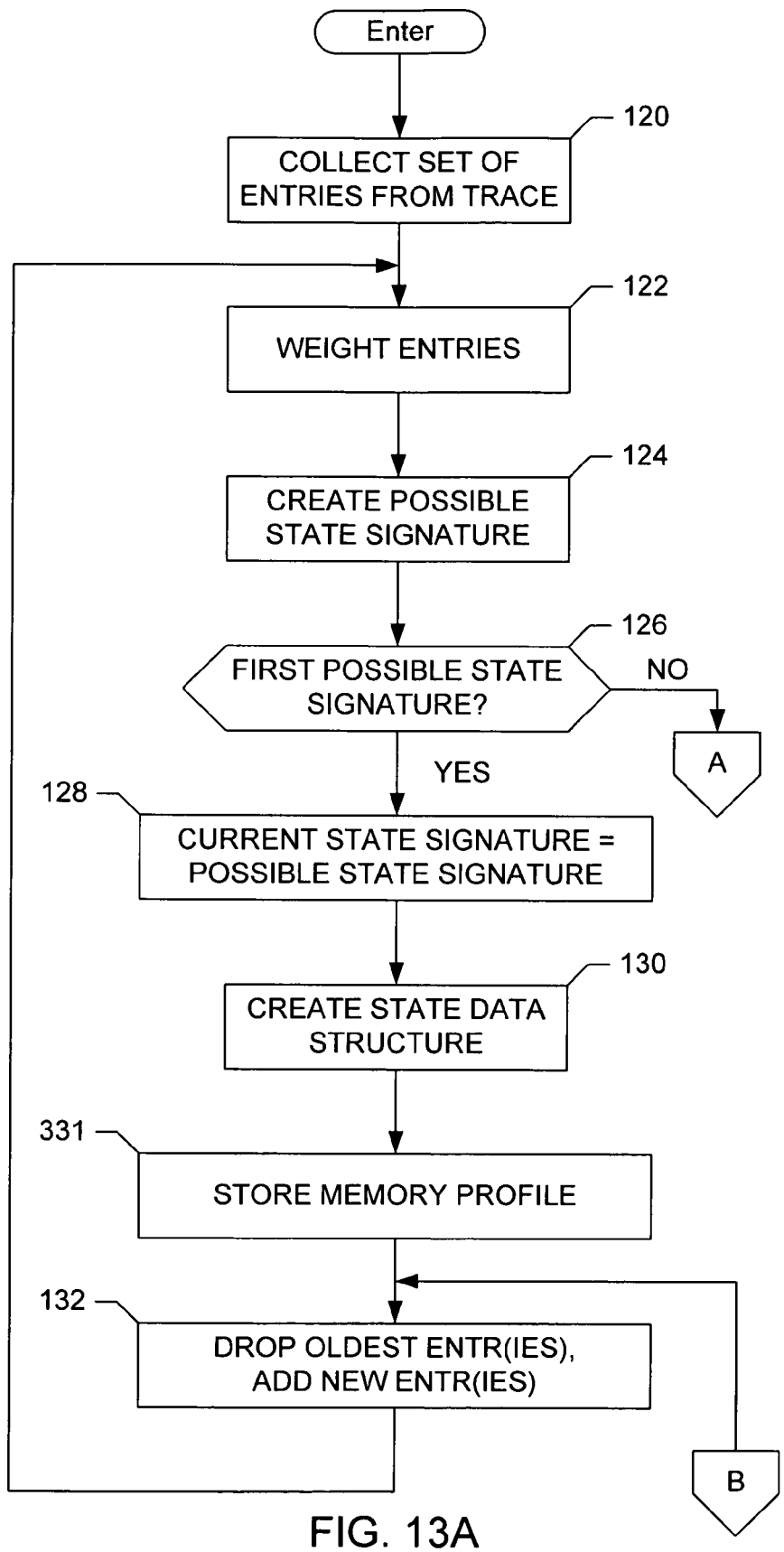
FIGS. 13A-13C are flowcharts illustrating example machine readable instructions for implementing the state identifier, the memory state monitor, the prefetcher, and the predictor of the apparatus of FIG. 10.
Figure 13B:
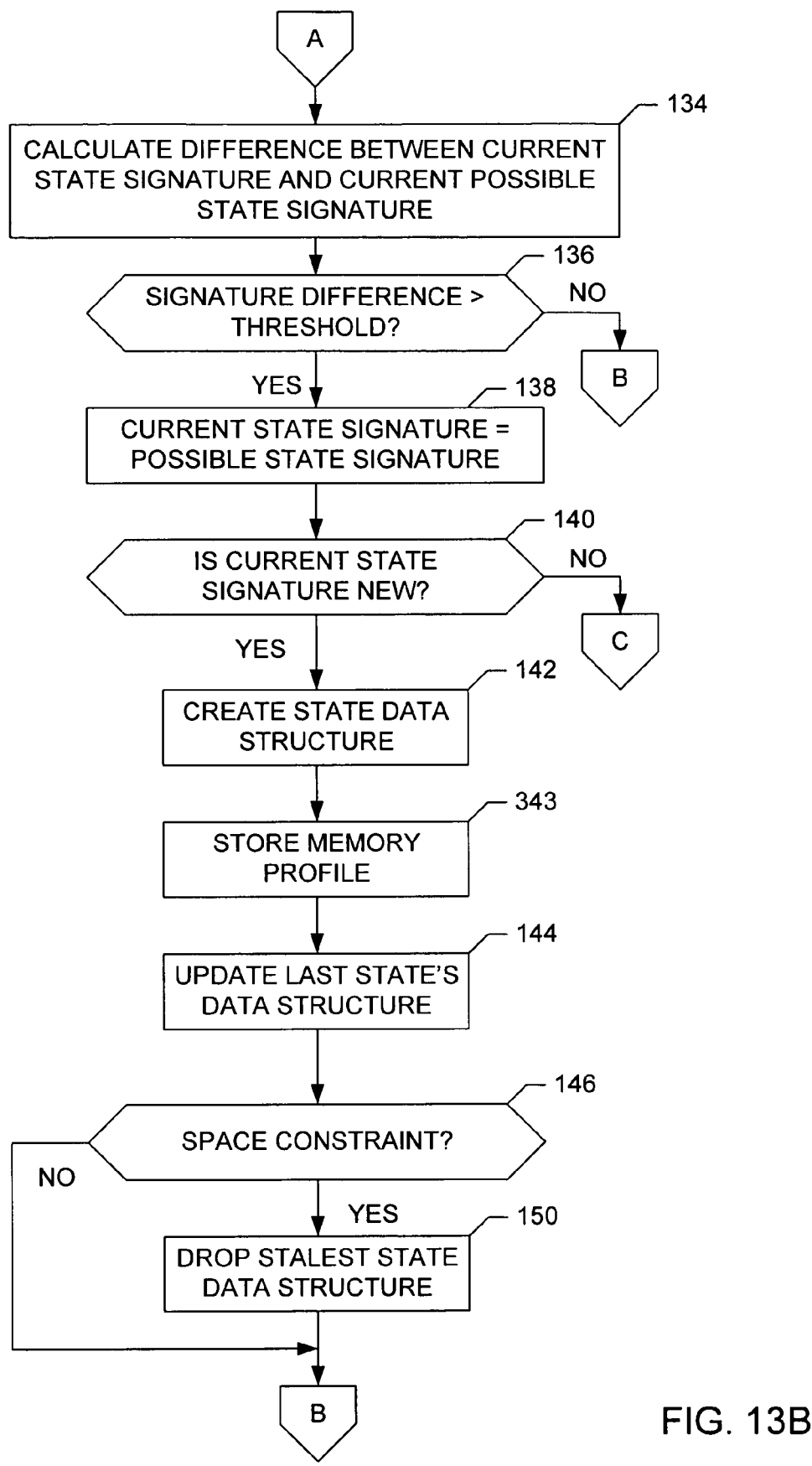

When at block 126 of FIG. 13A, the current possible state signature is not the first possible state signature, control will skip from block 126 to block 134 (FIG. 13B). At block 134, the state distinguisher 38 calculates the difference between the current state signature, and the current possible state signature. The state distinguisher 38 then compares the computed difference to a threshold. If the computed difference exceeds the threshold (block 136), a program state change has occurred and control proceeds to block 138. If the computed difference does not exceed the threshold (block 136), the signature developer 16 collects the next set 26 of entries for creation of a possible state signature 28 (block 132, FIG. 13A) and control returns to block 122 as explained above. By adjusting the threshold, one may adjust the duration and number of the program states. It is, thus, this threshold that may be adjusted to ensure the prefetching operation is performed at an appropriate time as explained above.

Figure 13C:
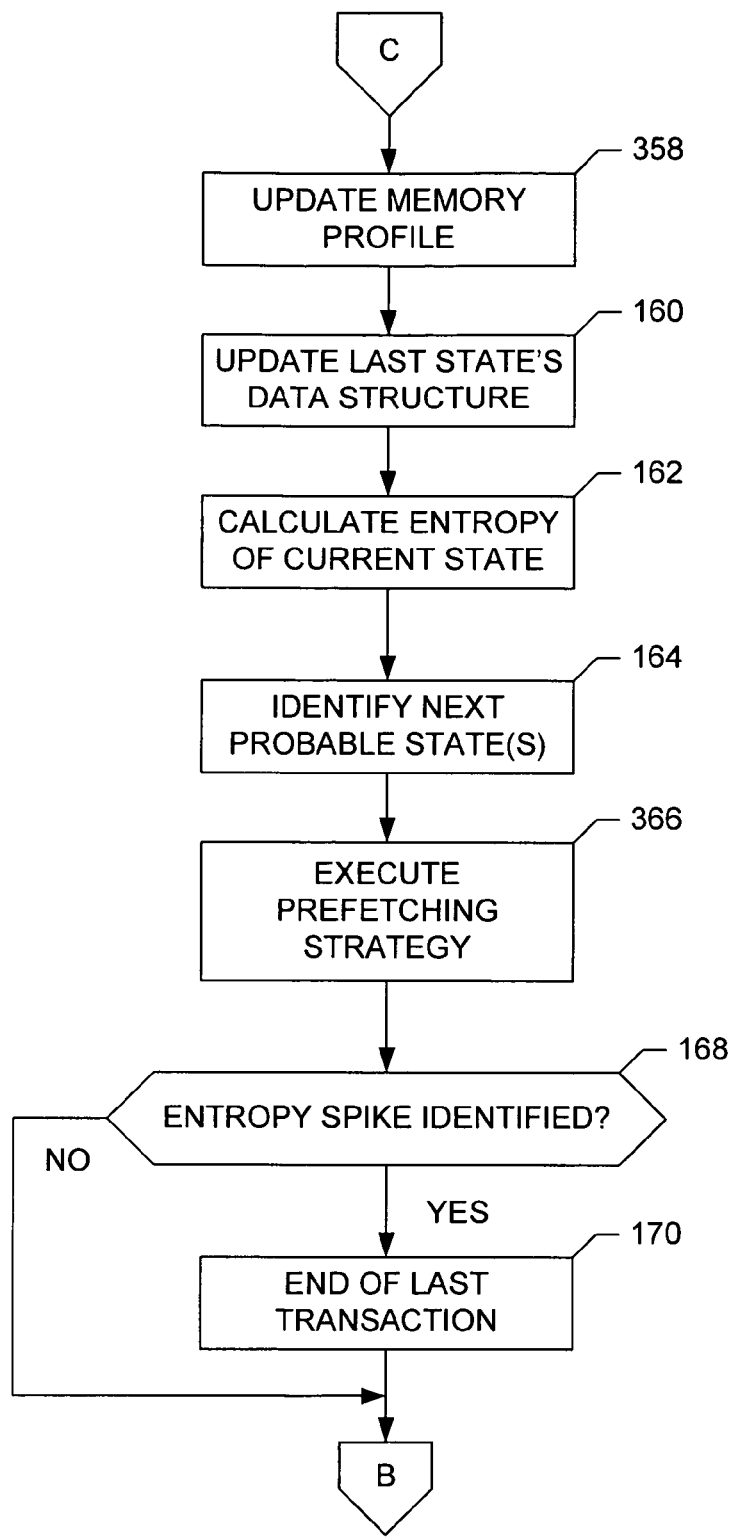

Assuming for purposes of discussion that a program state change has occurred (block 136 of FIG. 13B), the state distinguisher 38 sets the current state signature variable equal to the current possible state signature 28 (block 138). The state distinguisher 38 then examines the signatures present in the state array 44 to determine if the current state signature corresponds to the signature of a known state (block 140). If the current state signature is a known state signature, control advances to block 160 (FIG. 13C). Otherwise, if the current state signature is not a known state signature (i.e., the current state signature does not correspond to a state already existing in the state array 44), control advances to block 142 (FIG. 13B).

Assuming for purposes of discussion that the current state signature is not a known state signature (e.g., the current program state is a new program state) (block 140), the state distinguisher 38 creates a state data structure in the state array 44 for the first state (block 142) as explained above in connection with block 130. The memory state monitor 302 then writes the memory references of the memory profile associated with the current state in the state data structure (block 343).

The state transition monitor 48 then updates the last state's probability sub-array to reflect the transition from the last state to the new current state (block 144). Control then proceeds to block 146 where the state distinguisher 38 determines if the state array 44 has become full. If the state array 44 is not full (block 146), control returns to block 132 of FIG. 13A. If the state array is full (block 146), control advances to block 150 (FIG. 13B) where the state distinguisher 38 deletes the stalest state data structure from the state array 44. Once the stalest state data structure is eliminated (block 150), control returns to block 132 of FIG. 13A.

Assuming that the current state signature is a known state signature (block 140 of FIG. 13B), control proceeds to block 358 (FIG. 13C). At block 358, the memory state monitor 302 updates the memory profile of the current state. For example, the memory state monitor 302 may filter the memory profile by adding, deleting, and/or changing one or more of the memory references in the memory profile to reflect the memory references most recently associated with the program state as explained above.

The state transition monitor 48 then updates the last state's probability sub-array to reflect the transition from the last state to the new current state (block 160). Control then proceeds to block 162 where the entropy calculator 50 calculates the transitional entropy value of the current state.

Figure 14:
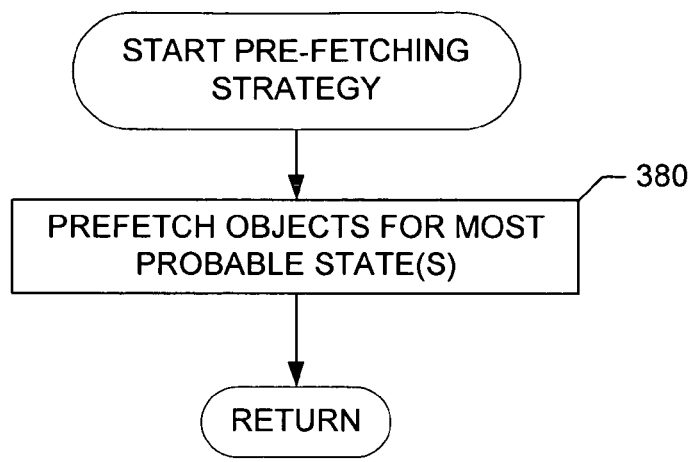
FIG. 14 is a flowchart illustrating example machine readable instructions which may be executed to implement a first example prefetching strategy.

Once the transitional entropy value is calculated (block 162), the event predictor 54 identifies the next most probable state(s) (block 164). The prefetcher 304 then executes the prefetching strategy of the apparatus 300. As explained above, there are many different prefetching strategies that may be employed by the prefetcher 304. For example, as shown in FIG. 14, the prefetcher 304 may always prefetch the memory objects for the next most probable state or a set of the next most probable states identified by the predictor 46 (block 380). Alternatively, as shown in FIG. 15, the prefetching activity of the prefetcher 304 may be dependent upon the transitional entropy value calculated for the current program state.

Figure 15:
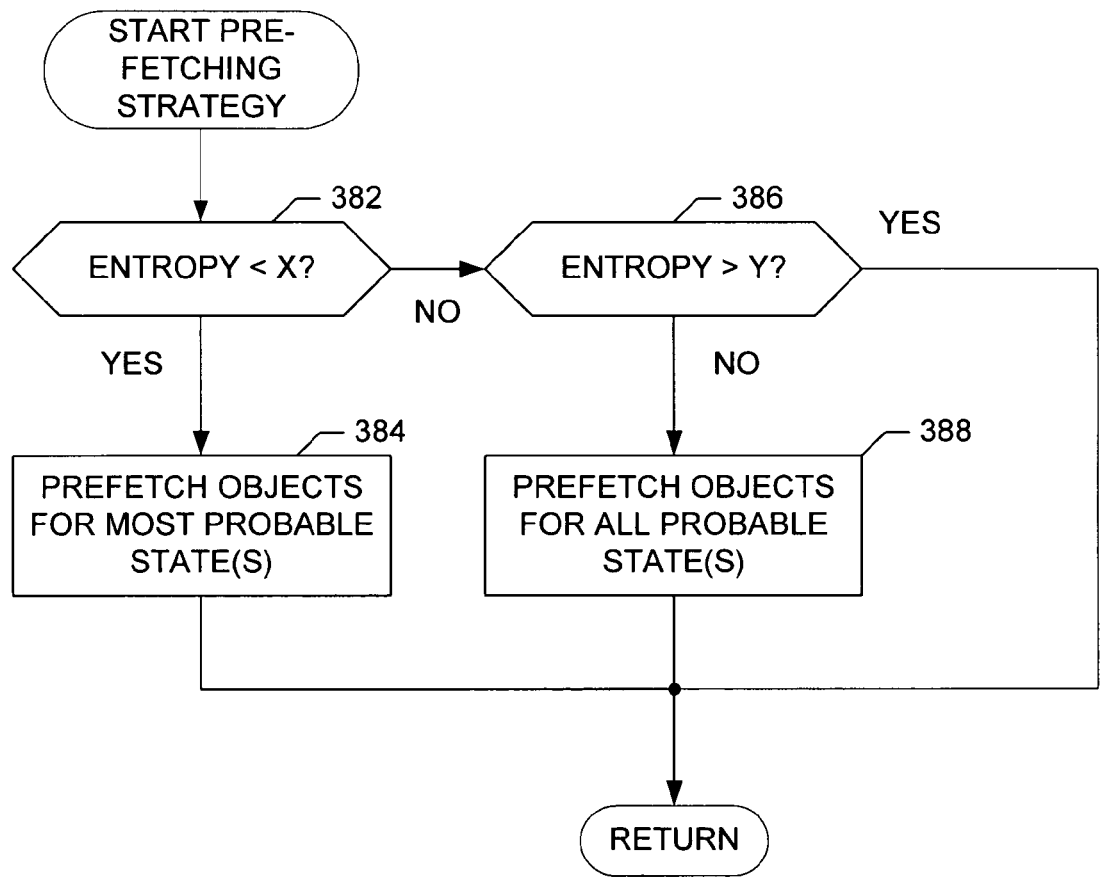
FIG. 15 is a flowchart illustrating example machine readable instructions which may be executed to implement a second example prefetching strategy.

In the example of FIG. 15, the prefetcher 304 first retrieves and compares the transitional entropy value of the current program state to a threshold X (block 382). If the transitional entropy value of the current state is below the threshold X (block 382), the prefetcher 304 prefetches the memory objects associated with the most probable state or states (again, depending on the strategy employed) (block 384). If, however, the transitional entropy value of the current state is above the threshold X (block 382), the prefetcher 304 compares the transitional entropy value of the current program state to a threshold Y (block 386). If the transitional entropy value of the current state is below the threshold Y (block 386), the prefetcher 304 prefetches the memory objects associated with all of the known next probable states (block 388). If, however, the transitional entropy value of the current state is above the threshold Y (block 386), the prefetcher 304 does not prefetch any memory objects at this time.

Irrespective of the prefetching strategy employed, after the prefetching strategy is executed (block 366), control advances to block 168 (FIG. 13C). At block 168, the event predictor 54 examines the transitional entropy values of the last few states to determine if a transitional entropy spike has occurred (block 168). If an entropy spike is identified (block 168), the event predictor 54 identifies the program state corresponding to the entropy spike as the last state of a program phase and/or the last state of a macroscopic transaction (block 170). If an entropy spike is not identified (block 168), the end of a program phase or the end of a macroscopic transaction has not occurred. Accordingly, control skips block 170 and returns to block 132 (FIG. 13A).

As noted in the above example, a spike in the transitional entropy value indicates that the program state associated with the spike is the last program state in a program phase and/or the last program state in a macroscopic transaction. However, a spike in transitional entropy does not distinguish between the end of a phase and the end of a macroscopic transaction.

Figure 16:
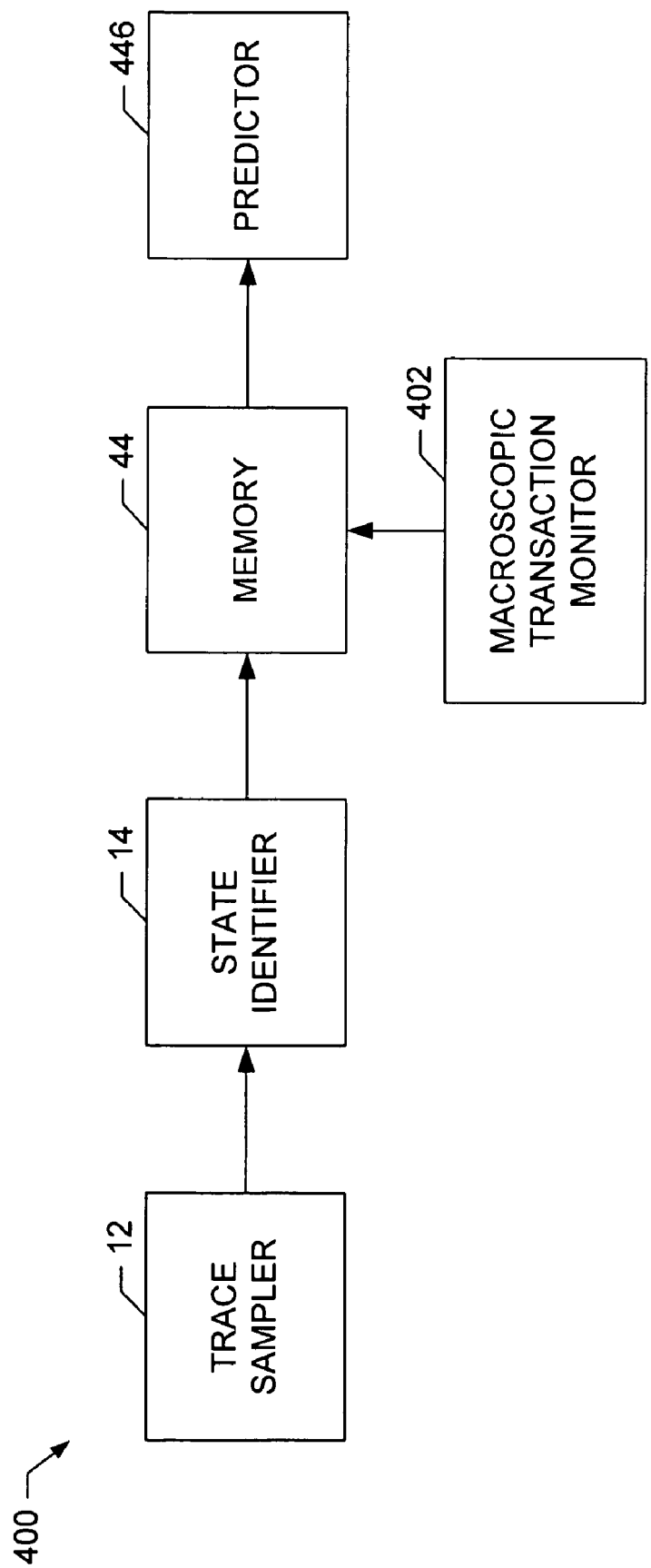
FIG. 16 is a schematic illustration of an example apparatus to detect a macroscopic transaction boundary in a program.

The example apparatus 400 illustrated in FIG. 16 introduces a second order metric, namely, transactional entropy, as a mechanism to distinguish the end of a macroscopic transaction from the end of a program phase. As used herein, transactional entropy refers to the uncertainty associated with transitioning between macroscopic transactions.

The example apparatus 400 of FIG. 16 utilizes some of the same structures as the apparatus 10 of FIG. 1 (as shown in FIG. 16 by the structures bearing the same names and/or reference numbers as the corresponding structures in FIG. 1), modifies some structures (i.e., the predictor 46), and adds other structures to perform additional functionality. However, persons of ordinary skill in the art will appreciate that, if desired, structures appearing in the example apparatus 10 may be eliminated from the example apparatus 400 of FIG. 16. Additionally, although for simplicity of illustration, the apparatus 400 is described as similar to the apparatus 10, persons of ordinary skill in the art will readily appreciate that the apparatus 400 could alternatively be similar to the apparatus 300. In other words, the apparatus 400 could incorporate some or all of the functionality of the apparatus 300.

Since there is overlap between the structures and functionality of the example apparatus 10 and the example apparatus 400, in the interest of brevity, descriptions of the overlapping structures and functions will not be fully repeated here. Instead, the interested reader is referred to the corresponding description of the example apparatus 10 of FIG. 1 for a complete description of the similar structures appearing in the example apparatus 400 of FIG. 16. To facilitate this process, like structures are labeled with the same names and/or reference numerals in the figures and descriptions of the apparatus 10 and the apparatus 400.

Like the example apparatus 10, the example apparatus 400 includes a trace sampler 12 to develop a trace of a program of interest, and a program state identifier 14 to identify program states from the trace. It also includes a memory/state array 44 to store data structures containing data representative of the states identified by the program state identifier 14.

In the illustrated example, the trace sampler 12 uses instruction addresses to create an instruction trace. Persons of ordinary skill in the art will appreciate, however, that other types of traces may alternatively be employed to create the trace. For example, a memory trace may alternatively be used.

Irrespective of the type of trace created by the trace sampler 12, the state identifier 14 analyzes the trace to identify a series of program states as explained above in connection with the example apparatus 10 of FIG. 1. As in the example apparatus 10 of FIG. 1, the program states identified by the state identifier 14 are represented by state data structures stored in the memory/state array 44. The state data structures stored in the state array 44 preferably include the fields described above in connection with the example state data structure shown in FIG. 5 (e.g., state signature, age, usage frequency, transitional entropy, etc.).

In order to identify a transactional entropy value associated with the macroscopic transactions of the workload, the apparatus 400 is further provided with a macroscopic transaction monitor 402. As will be appreciated by persons of ordinary skill in the art, workloads are typically comprised of a predetermined set of possible macroscopic transactions (e.g., order, browse, payment, add to shopping cart, etc.). The macroscopic transaction monitor 402 develops statistics reflective of entries to (or exits from) these macroscopic transactions by, for example, analyzing a transaction log created by the server executing the program in question. The statistics developed by the macroscopic transaction monitor 402 are then used to determine the transactional entropy value associated with the workload. Persons of ordinary skill in the art will readily appreciate that, for most workloads, the transaction mix does not change with time (e.g., batch processing of credit card, mortgage, or stock transactions). Therefore, for such workloads, the macroscopic transaction monitor 402 may optionally calculate a transactional entropy value for the workload at one time (e.g., prior to analyzing the workload for program states, etc.). That calculated transactional entropy value may then be repeatedly used for that workload without the necessity of recalculating the transactional entropy value as the trace is analyzed. In some workloads, however, the transaction mix may change as a function of time. In such workloads, the macroscopic transaction monitor 402 must continually (or at least repeatedly) monitor the workload and repeatedly re-calculate the transactional entropy value. However, even in the later case, the transactional entropy value does not change quickly.

Figure 17:
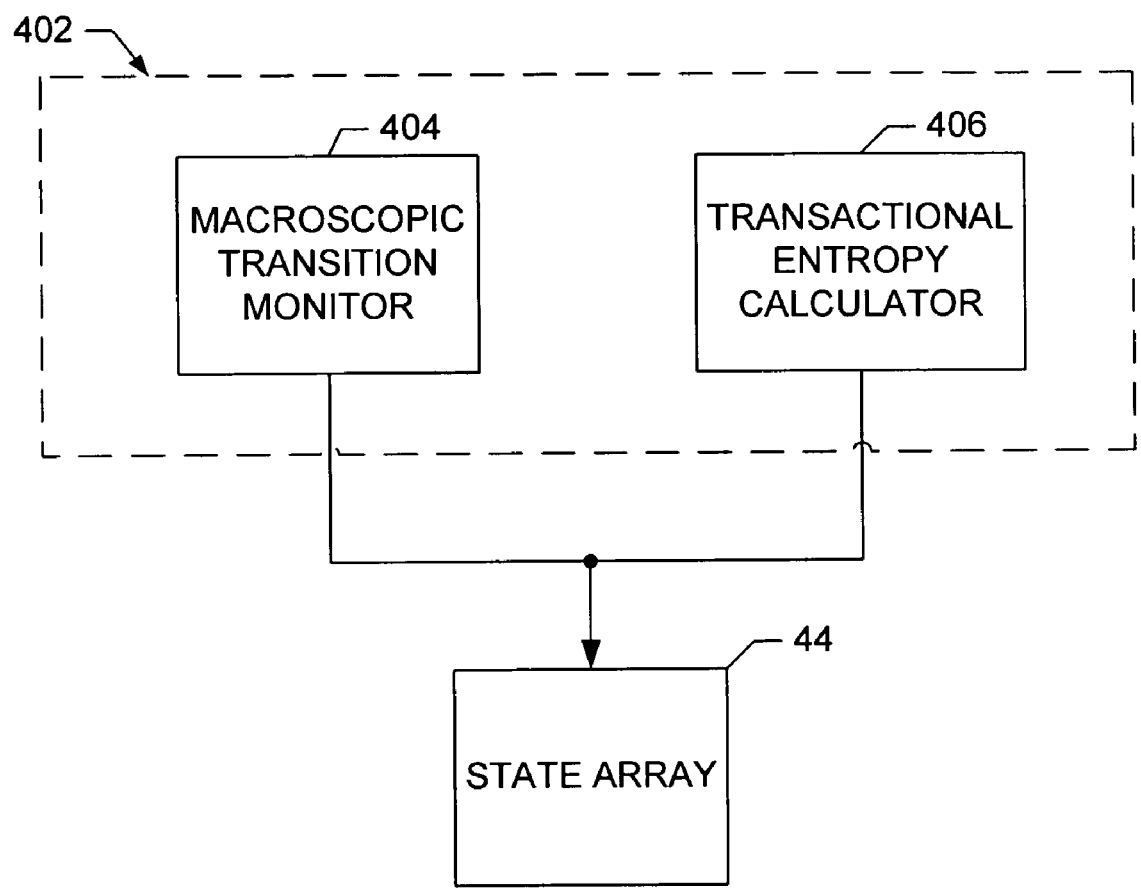
FIG. 17 is a more detailed schematic illustration of the macroscopic transaction monitor of FIG. 16.

An example macroscopic transaction monitor 402 is shown in greater detail in FIG. 17. In the example of FIG. 17, the example macroscopic transaction monitor 402 includes a macroscopic transition monitor 404 to calculate probabilities of execution for each macroscopic transaction in the workload. The macroscopic transition monitor 404 performs this calculation by, for example, accessing a transaction log generated by a server executing the program of interest. In particular, the macroscopic transition monitor 404 reviews the transaction log to compile statistics reflecting the total number of times each type of transaction in the workload is executed in a given period of time. For example, if there are three possible transactions, A, B, & C, the macroscopic transition monitor 404 will count and store the total number of times transaction A is executed, the total number of times transaction B is executed, and the total number of times transaction C is executed.

The macroscopic transition monitor 404 employs these statistics to calculate probabilities of execution for each of the transactions. For example, consider the artificially simplified situation where transaction A is executed 50 times, transaction B is executed 30 times, and transaction C is executed 20 times. In such circumstances, the macroscopic transition monitor 404 will calculate that there is a 50% probability that transaction A is being executed at any given time (i.e., 50/(50+30+20)*100=50%), that there is a 30% probability that transaction B is being executed at any given time (i.e., 30/(50+30+20)*100=30%), and that there is a 20% probability that transaction C is being executed at any given time (i.e., 20/(50+30+20)*100=20%).

In order to convert the probabilities calculated by the macroscopic transition monitor 404 into the transactional entropy value, the macroscopic transaction monitor 402 is further provided with a transactional entropy calculator 406. The transactional entropy calculator 406 converts the probabilities to the transactional entropy value in accordance with the Shannon formula discussed above:

$$H_T = -K\Sigma(C_i * \log C_i),$$

where $H_T$ is the transactional entropy value, K is a constant and $C_i$ is the probability of executing macroscopic transaction i. In other words, if we assume for simplicity that there are only two macroscopic transactions in a workload of interest, the transactional entropy calculator 406 converts the probabilities to the transactional entropy value by calculating a sum of (1) a product of (a) the probability of executing the first macroscopic transaction, and (b) a logarithm of the probability of executing the first macroscopic transaction, and (2) a product of (a) the probability of executing the second macroscopic transaction and (b) a logarithm of the probability of executing the second macroscopic transaction. The sum may then be multiplied with a constant (K) to arrive at the transactional entropy value.

As stated above, for most workloads, the probabilities of execution for the macroscopic transactions are static. Therefore, for most workloads, the transactional entropy value need only be calculated once. In other workloads, the probabilities of execution of the macroscopic transactions vary as a function of time. In such circumstances, the probabilities of execution may be recalculated over time (e.g., by using a running average or an exponential running average as explained above) and the transactional entropy value may likewise be re-calculated to reflect the variance over time of the transactional entropy value of the workload.

Irrespective of whether the transactional entropy value is static or time varying, the transaction entropy value of the workload is stored in the memory 44.

As mentioned above, the apparatus 400 is provided with a modified version of the predictor 46. In particular, whereas the predicator 446 may perform some or all of the functions of the predictors 46 of the apparatus 10, 300, the predictor 446 is further adapted to utilize the transaction entropy value to identify a program state occurring at the end of a macroscopic transaction. In particular, as in the apparatus 10, 300, the predictor 446 determines program state entropy values associated with the program states. However, the predictor 446 is also constructed to identify a program state associated with a program state (i.e., transitional) entropy value that is substantially equal to the transactional entropy value of the workload as occurring at a macroscopic transaction boundary (i.e., as the last program state in a macroscopic transaction).

As stated above, the apparatus 10 identified the last state in a program phase and/or a macroscopic transaction. However, because the last state in a macroscopic transaction is always the last state in a program phase (i.e., the last state in a macroscopic transaction is also the last state in a program phase because a program phase cannot overlap two transactions), the apparatus 10 was unable to determine whether the "last state" it identified was actually the last state in a macroscopic transaction or just the end of a program phase. In contrast, by employing the transactional entropy metric, the apparatus 400 of FIG. 16 is able to distinguish (1) program states that are the last state in a macroscopic transaction and the last state in a program phase from (2) program states that are the last state in a program phase but are not the last state in a macroscopic transaction. Identifying macroscopic transaction boundaries and microscopic transaction boundaries (i.e., program phase changes) provides several benefits. For example, such boundaries are logical points to make changes in optimization strategies (e.g., to perform re-optimization).

It bears emphasis that, although the example apparatus 400 has been described as a modification of the apparatus 10 of FIG. 1, persons of ordinary skill in the art will readily appreciate that the principles and functions disclosed in connection with the apparatus 400 of FIG. 16 could likewise be applied to the apparatus of FIG. 10 and/or to other apparatus and methods.

Figure 18:
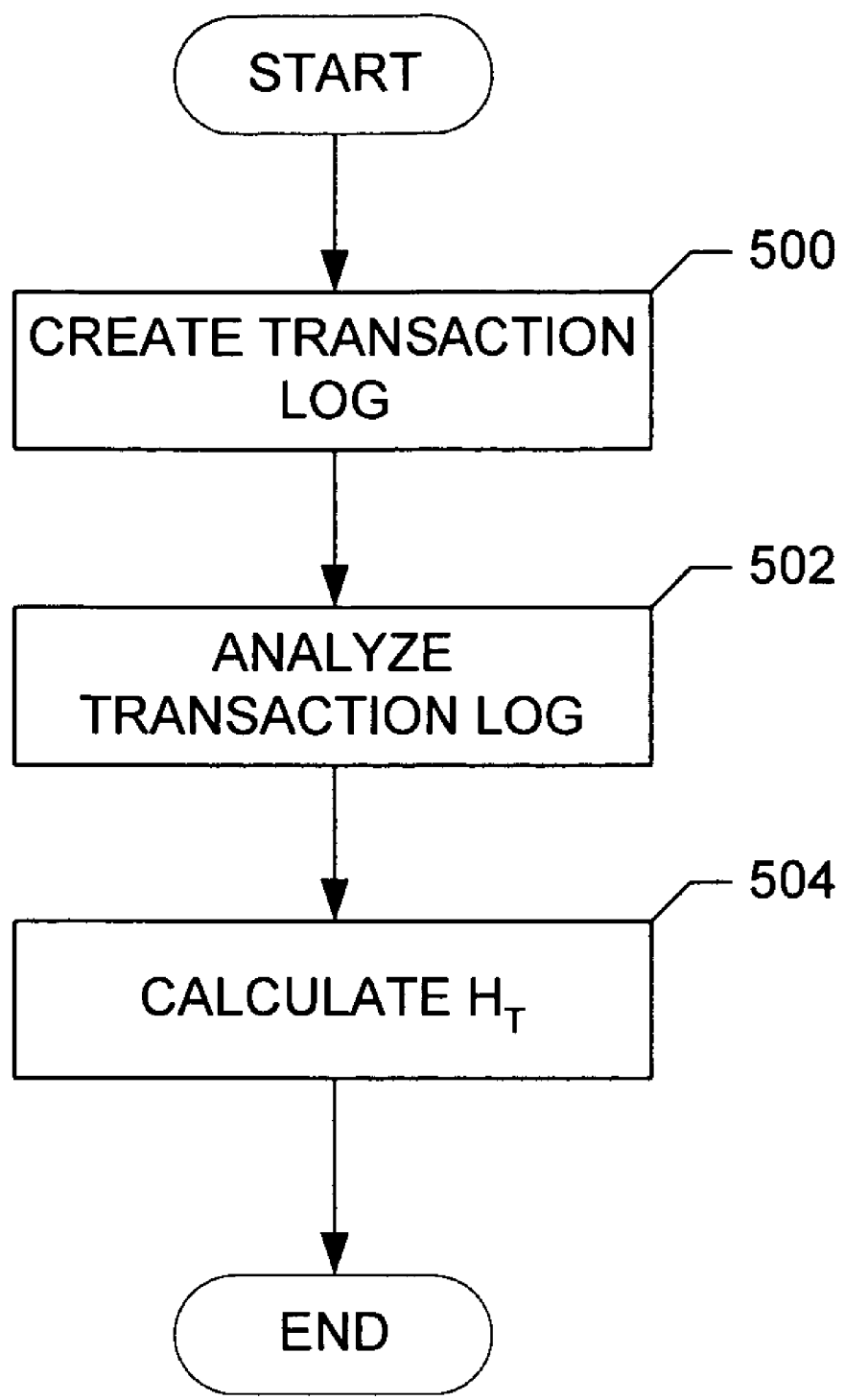
FIG. 18 is a flowchart representing example machine readable instructions which may be executed to implement the macroscopic transition monitor and the transactional entropy calculator of FIG. 17.
Figure 19:
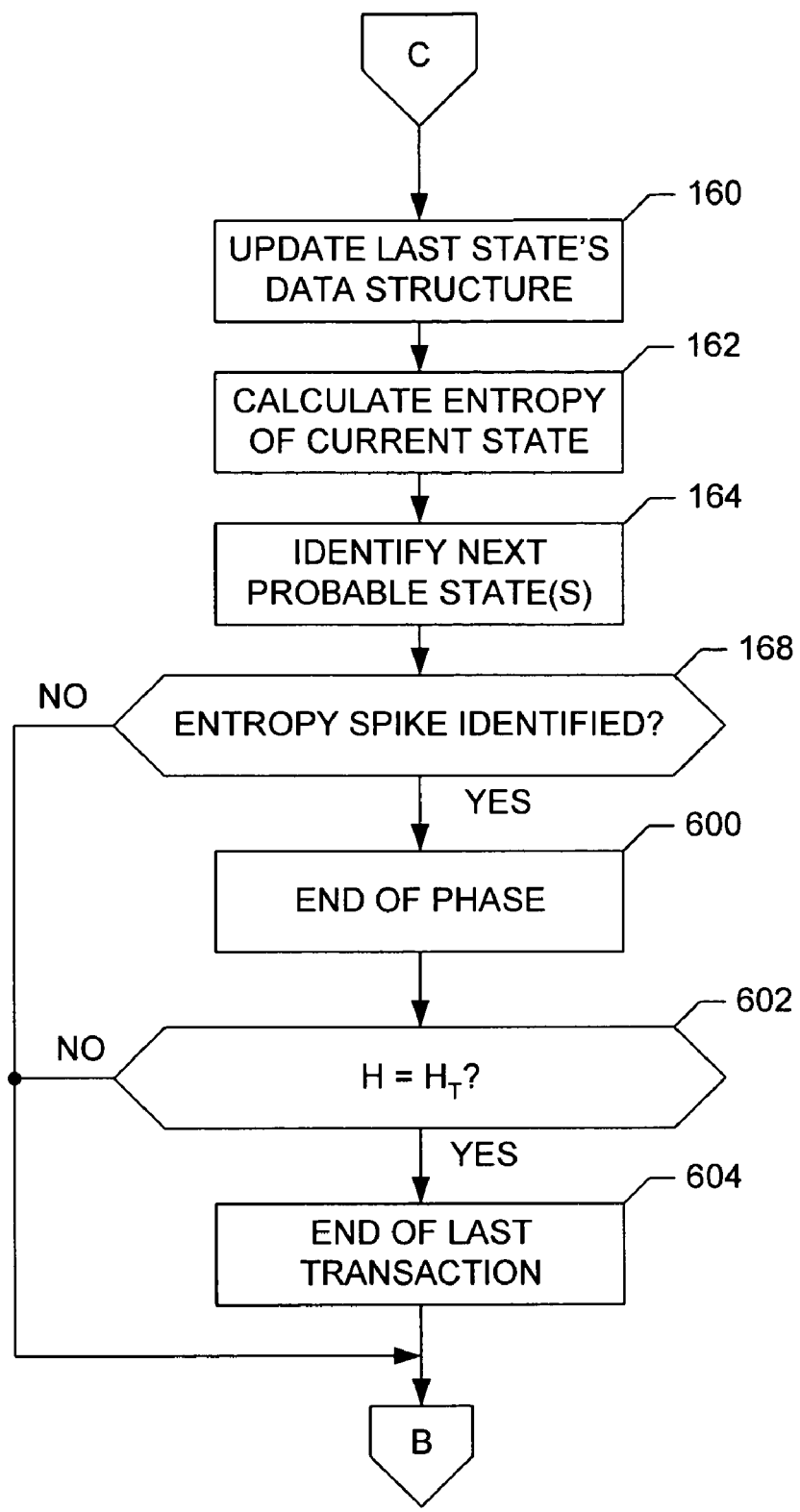
FIG. 19 is a flowchart representing example machine readable instructions which may be executed to implement at least a portion of the predictor of FIG. 16.

Flowcharts representative of example machine readable instructions for implementing the apparatus 400 of FIG. 16 are shown in FIGS. 18 and 19. In this example, the machine readable instructions comprise a program for execution by a processor such as the processor 1012 shown in the example computer 1000 discussed below in connection with FIG. 24. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the trace sampler 12, the state identifier 14, the predictor 446, the macroscopic transaction monitor 402, the macroscopic transition monitor 404, and/or the transactional entropy calculator 406 could be implemented by software, hardware, and/or firmware. Further, although the example program is described with reference to the flowcharts illustrated in FIGS. 18 and 19, persons of ordinary skill in the art will readily appreciate that many other methods of implementing the example apparatus 400 may alternatively be used. For example, the order of execution of the blocks may be changed, and/or some of the blocks described may be changed, eliminated, or combined.

Turning first to FIG. 18, the program of FIG. 18 begins at block 500 where a transaction log is generated. As discussed above, the transaction log may be created by a server executing the program of interest. The transaction log will typically identify the macroscopic transactions handled by the server within a given time period. Since a transaction log is often generated by a server as a matter of course, block 500 of FIG. 18 may be redundant and may be eliminated from FIG. 18.

After the transaction log is obtained (block 500), the macroscopic transition monitor 404 analyzes the transaction log. In the illustrated example the macroscopic transition monitor 404 analyzes the transaction log by compiling statistics reflecting the total number of times each type of transaction in the workload is executed in a given period of time. The macroscopic transition monitor 404 employs these statistics to calculate probabilities of execution for each of the transactions.

After the transaction log has been analyzed (block 502), the transactional entropy calculator 406 calculates the transaction entropy $H_T$ (block 504). As discussed above, in the illustrated example, the transactional entropy calculator 406 converts the probabilities generated by the macroscopic transition monitor 404 to the transactional entropy value $H_T$ via the Shannon formula.

After the transactional entropy value is calculated (block 504), the program of FIG. 18 ends. Alternatively, if the probabilities of execution of the macroscopic transactions of the workload being analyzed vary as a function of time, control may return to block 500 to begin the process of re-calculating the transactional entropy value.

Since, as explained above, some of the structures of the example apparatus 400 are substantially identical to structures of the example apparatus 10, 300, if those overlapping structures are implemented via software and/or firmware, they may be implemented by similar programs. Thus, for example, the trace sampler 12, and the state identifier 14 may be implemented in the example apparatus 400 using substantially the same machine readable instructions described above in connection with FIGS. 8 and 9A-9C. Indeed, the program of FIGS. 8 and 9A-9B may be used identically to implement the apparatus 400 by replacing FIG. 9C with new FIG. 19. In the interest of brevity, the blocks of the program used to implement the apparatus 400 which are the same or substantially the same as the blocks of the program used to implement the apparatus 10 will not be re-described here. The interested reader is referred to the above description for a full description of those blocks. The following description of FIG. 19 assumes that FIG. 19 is being substituted for FIG. 9C. As indicated by the like reference numerals, blocks 160-168 of FIG. 19 are identical to blocks 160-168 of FIG. 9C. Therefore, rather than repeating the description of those blocks, the following description picks up at block 168 of FIG. 19.

If the predictor 446 determines that there is no spike in transitional entropy (block 168), control returns to block 132 (FIG. 9A). If, on the other hand, the predictor 446 determines that there has been a spike in the transitional entropy (block 168), the predictor 446 sets a flag indicating that the end of a program phase has occurred (block 600). Control then advances to block 602 to determine if the end of the program phase is also the end of a macroscopic transaction.

In particular, at block 602, the predictor 446 compares the transitional entropy value of the last state in the expiring program phase to the transactional entropy value of the workload in question. If those values are substantially equal (block 602), then the last state in the ending program phase is also the end of a macroscopic transaction. Therefore, the predictor 446 sets a flag indicating that the end of macroscopic transaction has occurred (block 604). Control then returns to block 132 of FIG. 9A. If, on the other hand, the transitional entropy value of the last state in the expiring program phase is not substantially equal to the transactional entropy value of the workload in question (block 602), control advances to block 132 of FIG. 9A without passing through block 604.

The effectiveness of the apparatus 400 and the methodology employed thereby has been tested using two different managed runtime workloads, namely, SPECjbb2000 and ECperf. SPECjbb2000 is a Java Business Benchmark from the SPEC organization. It is a server-side benchmark which emulates a 3-tier system with emphasis on the middle tier. A warehouse concept is implemented in the middle tier to simulate a threaded business transaction unit. The five types of transactions performed in SPECjbb2000 are: new orders, order status, payment, delivery, and stock level check, with a probability mix of 43.5%, 43.5%, 4.3%, 4.3%, and 4.3%, respectively.

ECperf was originally developed by Sun Microsystems® and is now managed by the JAVA Joint Community Process. ECperf is even more realistic then SPECJbb2000. ECperf mimics real world 3-tier business transaction workloads. It has since been adopted and further developed by the SPEC organization under the SPECjAppServer benchmark.

Figure 20:
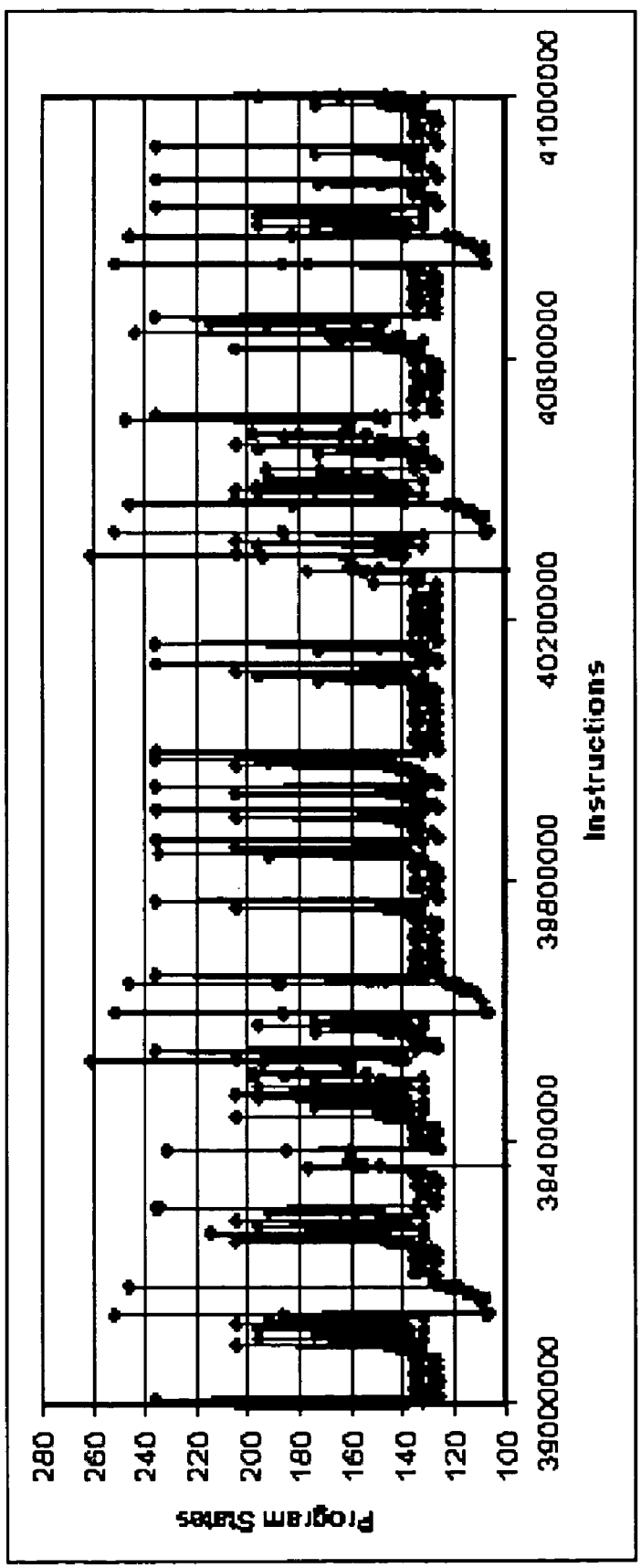
FIG. 20 is a chart graphing example program states as a function of time for an example workload.

When the apparatus 400 operates on the original SPECjbb2000 workload, the program execution traces includes a mixture of all five types of transactions noted above. FIG. 20 is a graph illustrating some of the program states identified in the SPECjbb2000 workload during a given time period. Due to the non-deterministic dynamic mix of the five transactions, no simple periodicity can be discerned in FIG. 20. However, it is still possible to identify distinctive, repeating patterns of program state sequences. Those repeating patterns reflect the reoccurrence of transactions having a characteristic program state composition and sequence.

Interesting observations can be made by sorting the program states identified by the apparatus 400 (e.g., some or all of the program states appearing in FIG. 20) such that: (1) occurrences of the same program states are grouped together, (2) the groups of program states are sorted with respect to one another in ascending order based on the first discovery time of the first instance of each program state, and (3) the program states occurring in each group are sorted within the group in ascending order of discovery time, and by graphing the sorted program states relative to their transitional entropy levels. Such a graph is shown in FIG. 21.

Figure 21:
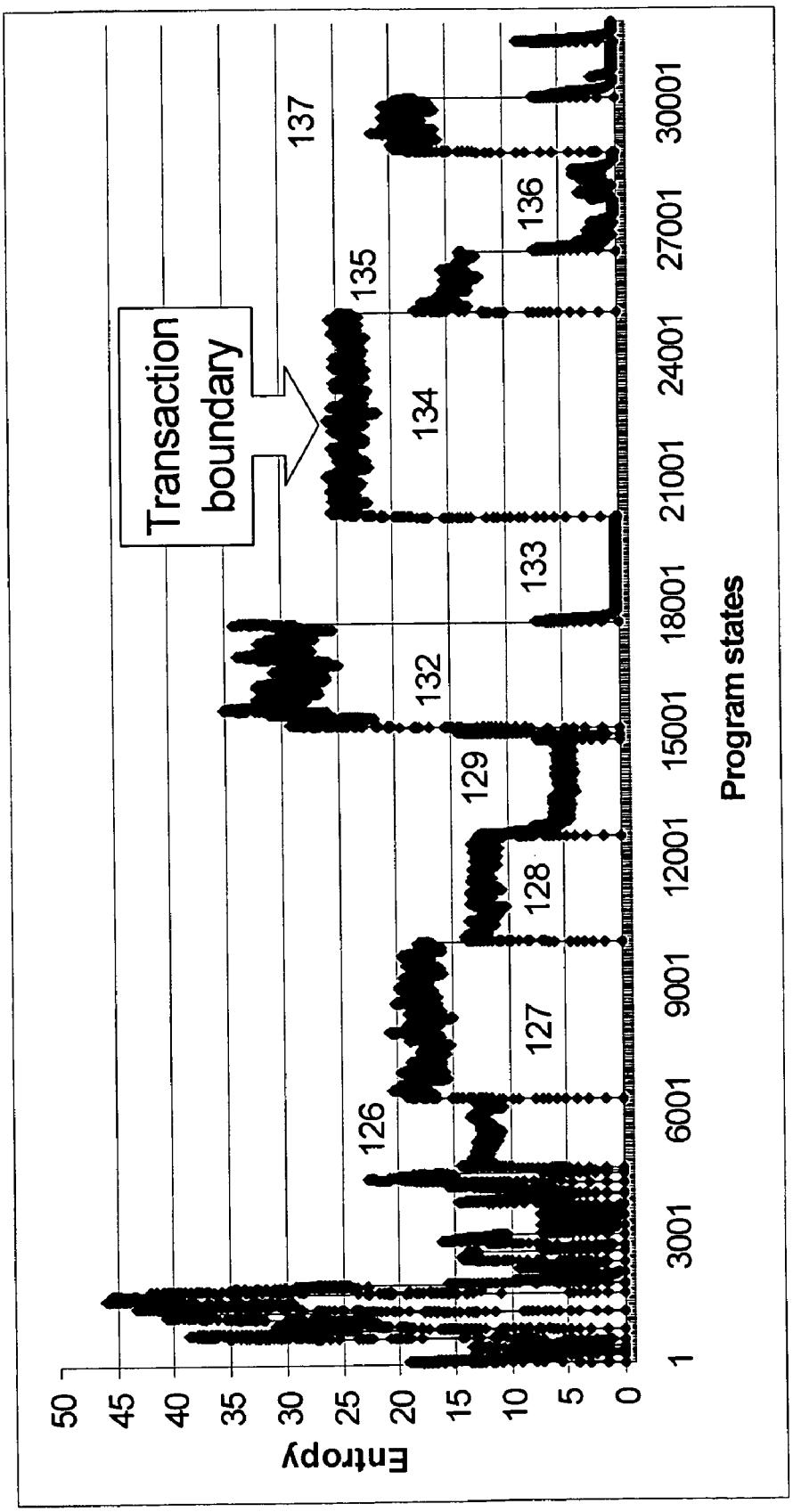
FIG. 21 is a chart graphing program state entropy values to program states (with like program states grouped together and the program states sorted within each group in ascending, time-of-discovery order) for an example workload exhibiting a crystalline structure.

In reviewing FIG. 21, it is immediately evident that most program states in the SPECjbb2000 workload are aggregated at only a few discrete transitional entropy levels. As noted above, a spike in the transitional entropy level of a state indicates the end of a program phase and, possibly also the end of a macroscopic transaction. Therefore, the states with high transitional entropy values (e.g., states 126, 127, 128, 132, 134, 135 and 137) define program phase boundaries.

As noted above, the SPECjbb2000 workload performs five types of transactions, namely, new orders, order status, payment, delivery, and stock level check. These transactions have probabilities of occurrence of 43.5%, 43.5%, 4.3%, 4.3%, and 4.3%, respectively. These probabilities do not change as a function of time. Therefore, using the Shannon formula discussed above, transactional entropy for the SPECjbb2000 workload can be calculated to be 1.1333K. If K=20, the transactional entropy value of the SPECjbb2000 workload is equal to 22.67. With the transactional entropy value for the SPECjbb2000 workload computed, a review of the graph of FIG. 21 identifies program state 134 as having a transitional entropy value that is substantially equal to the transactional entropy of the workload. There fore, program state 134 is identified as the boundary condition between macroscopic transactions. Consequently, we know that when program state 134 occurs, the SPECjbb2000 workload has likely reached the end of a macroscopic transaction.

A review of the graph of FIG. 21 also demonstrates that the SPECjbb2000 workload is a well-behaving workload that exhibits clearly phased behavior throughout program execution. Drawing an analogy to terminology used to describe physical (e.g., chemical) structures, programs exhibiting such clear phased behavior can be termed "crystal" programs.

Figure 22:
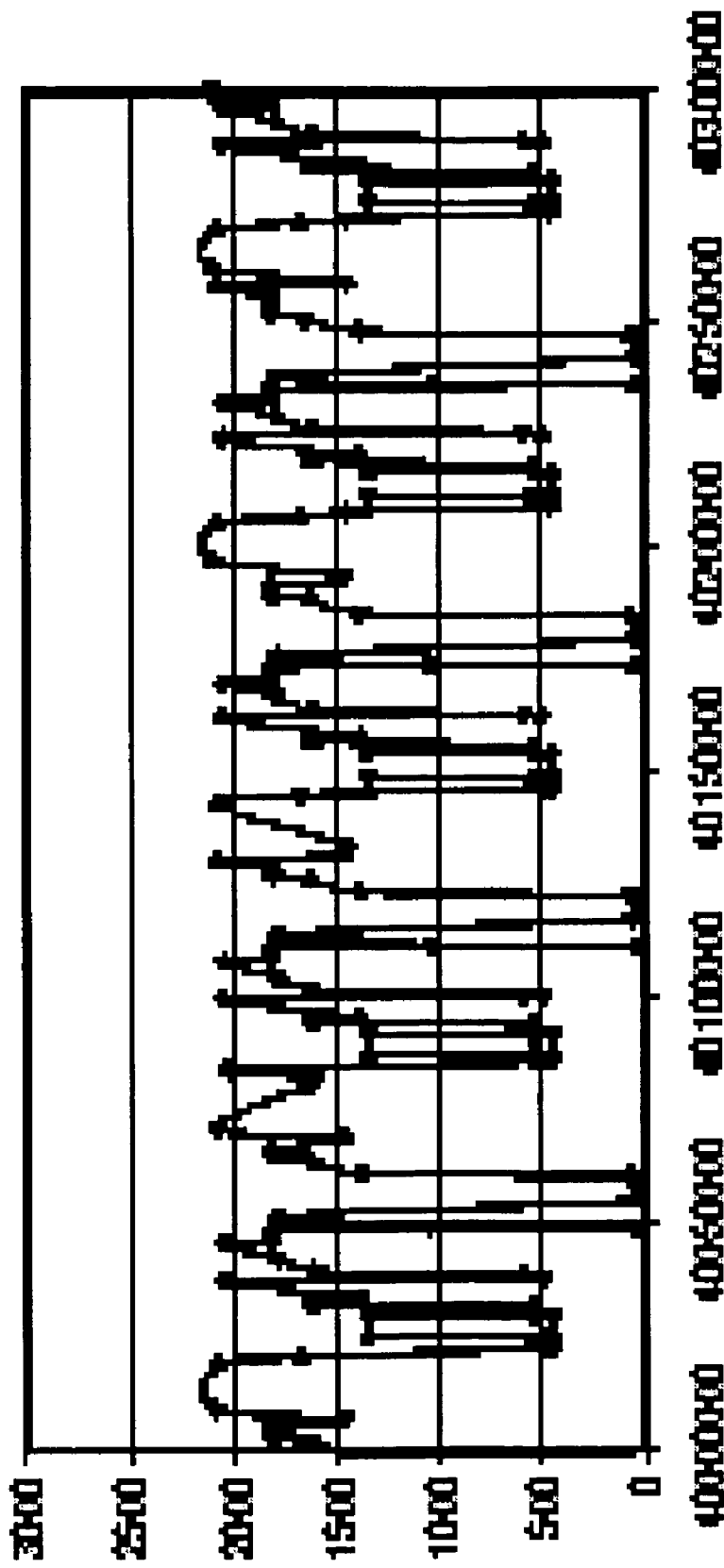
FIG. 22 is a chart graphing example program states as a function of time for another example workload.
Figure 23:
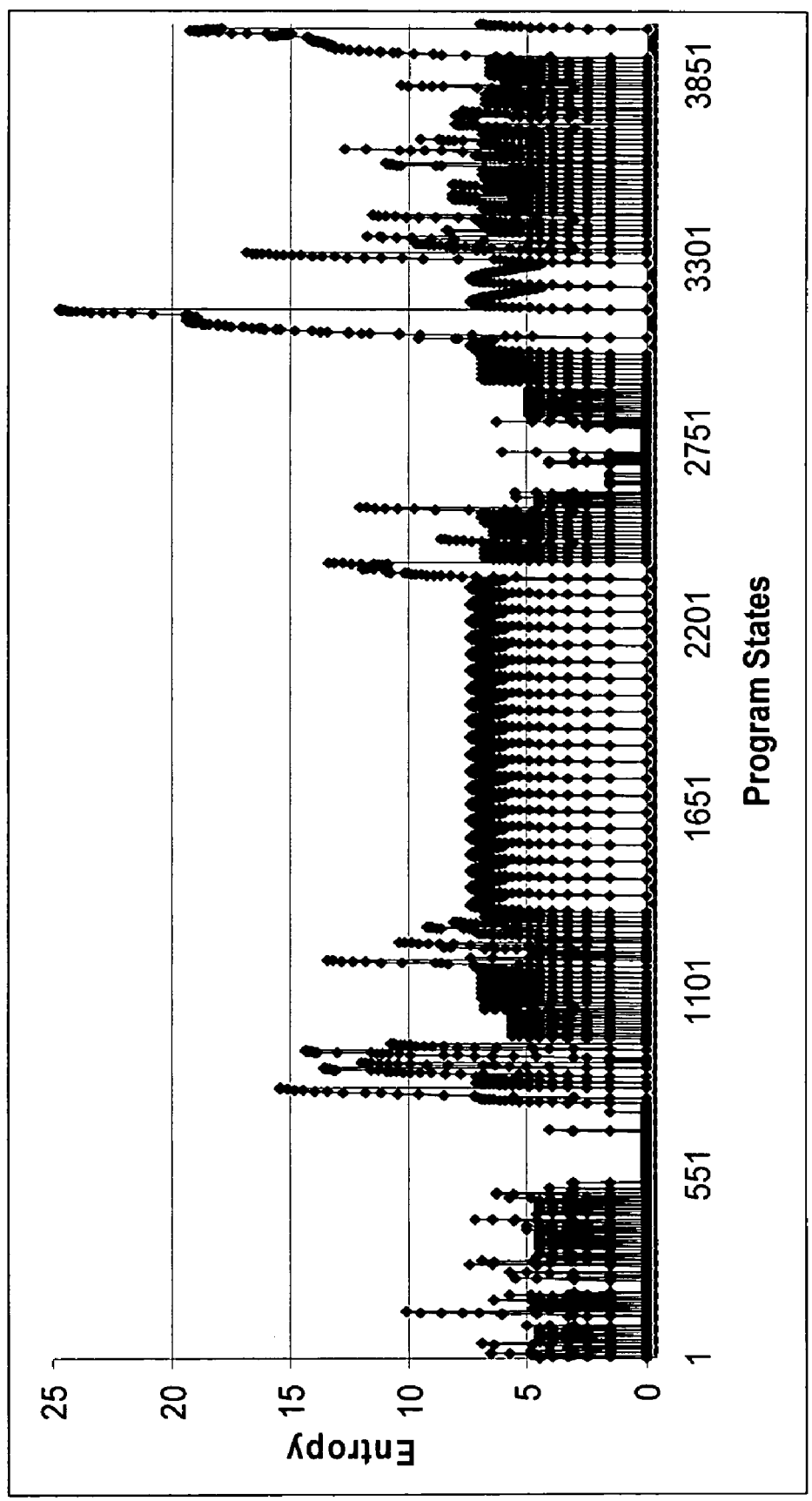
FIG. 23 is a chart graphing program state entropy values to program states (with like program states grouped together and the program states sorted within each group in ascending, time-of-discovery order) for an example workload exhibiting an amorphous structure.

When the apparatus 400 operates on the original ECperf workload, a very different result occurs. In particular, ECperf, which is a significantly larger workload than SPECjbb2000 in terms of both code size and pathlength, does not exhibit clearly phased behavior. To demonstrate this point, consider FIGS. 22 and 23. FIG. 22 is a graph illustrating some of the program states identified in the ECperf workload during a given time period. Thus, FIG. 22 is analogous to FIG. 20, but created for the ECperf workload instead of the SPECjbb2000 workload. FIG. 23 is a graph generated by sorting the program states identified by the apparatus 400 (e.g., some or all of the program states appearing in FIG. 22) such that: (1) occurrences of the same program states are grouped together, (2) the groups of program states are sorted with respect to one another in ascending order based on the first discovery time of the first instance of each program state, and (3) the program states occurring in each group are sorted within the group in ascending order of discovery time, and by graphing the sorted program states relative to their transitional entropy levels. In other words, the graph of FIG. 23 is analogous to the graph of FIG. 21.

As shown in FIG. 22, individual ECperf transactions in the workload display patterns which are characteristic of phased behaviors. However, as can be seen by comparing FIGS. 21 and 23, the entropy profile for the overall ECperf execution has diametrically different characteristics than the entropy profile of the SPECjbb2000 workload. In particular, the transitional entropy values of the ECperf execution have significantly higher variability than the transitional entropy values of the SPECjbb2000 workload. In other words, whereas the SPECjbb2000 workload exhibited a crystal type phased behavior, the ECperf workload is conspicuously "amorphous."

It can be much more difficult to accurately predict program states in amorphous workloads than in crystal workloads. Specifically, a performance engineer might conclude that static optimization at the beginning of program execution is sufficient for a crystal type workload, but that maintaining a large set of static optimization parameters, or else continuously re-optimizing may be appropriate for amorphous workloads.

Figure 24:
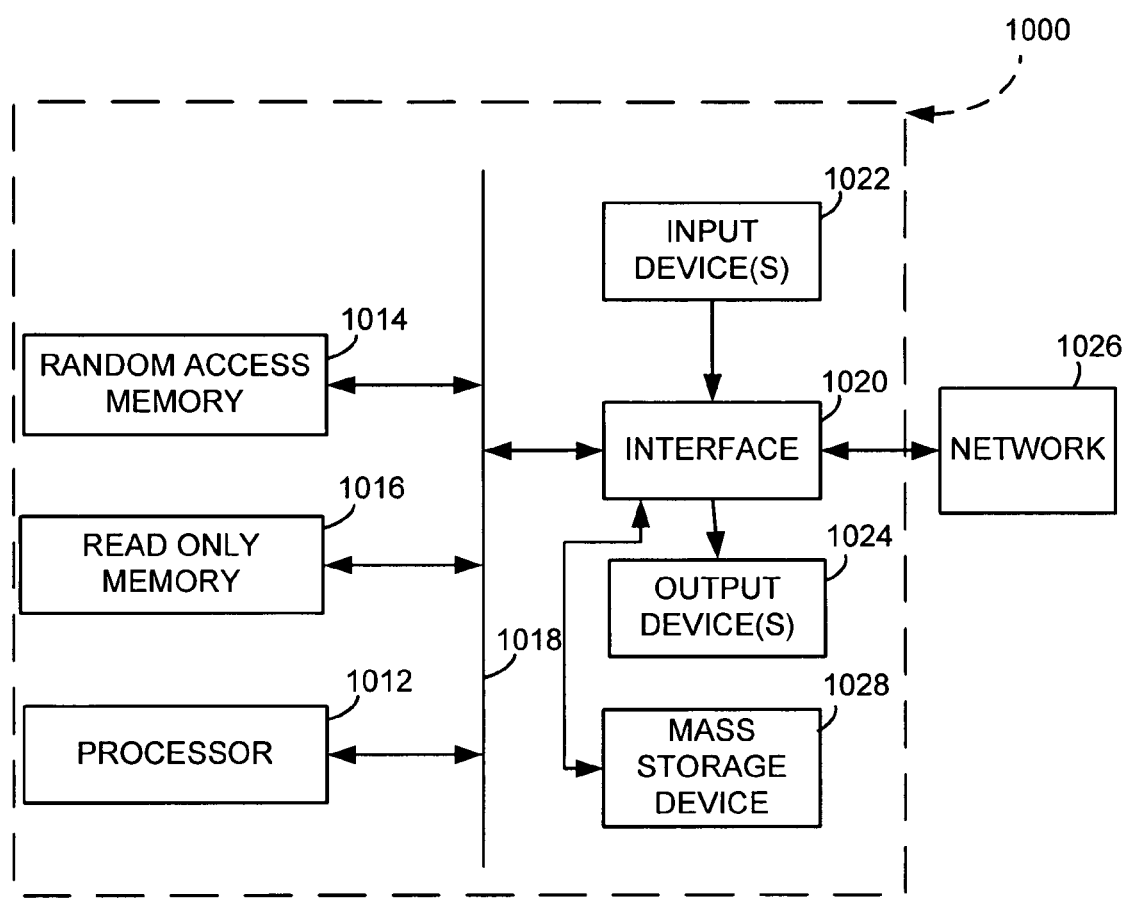
FIG. 24 is a schematic illustration of an example computer which may execute the programs of FIGS. 8 and 9A-9C to implement the apparatus of FIG. 1, and/or which may execute the programs of FIG. 8, FIGS. 13A-13C, FIG. 14 and/or FIG. 15 to implement the apparatus of FIG. 10, and/or which may execute the programs of FIGS. 8, 18, 9A, 9B, and 19 to implement the apparatus of FIG. 16.

FIG. 24 is a block diagram of an example computer 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012. For example, the processor 1012 can be implemented by one or more Intel® microprocessors from the Pentium® family, the Itanium® family, the XScale® family, or the Centrino™ family. Of course, other processors from other families are also appropriate.

The processor 1012 is in communication with a main memory 306 including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touch screen, a trackpad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the memory 44.

As an alternative to implementing the methods and/or apparatus described herein in a system such as the device of FIG. 24, the methods and/or apparatus described herein may alternatively be embedded in a structure such as processor and/or an ASIC (application specific integrated circuit).

From the foregoing, persons of ordinary skill in the art will appreciate that the above disclosed methods and apparatus may be implemented in a static compiler, a managed run-time environment just-in-time compiler (JIT), and/or directly in the hardware of a microprocessor to achieve performance optimization in executing various programs and/or in memory operations associated with an executing program. In the context of the apparatus 300 and/or the apparatus 400, a static compiler could exploit the predictable repetitive behavior by generating speculative threads to prefetch the memory objects associated with the next probable program states. Similarly, an MRTE JIT (managed run time environment just in time) engine could use the above disclosed methodology to prefetch memory objects based on dynamic profiling. In the hardware context, the predictive capabilities of the disclosed methods and apparatus could be employed for dynamic management of hardware-resources such as power and cache sizes in response to the end of a program phase or macroscopic transaction.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of detecting a macroscopic transaction boundary in a program workload comprising:
   developing a trace of a program;
   identifying a sequence of program states from the trace;
   determining program state entropy values associated with the program states identified in the sequence;
   identifying a transactional entropy value associated with macroscopic transactions of the workload, wherein each of the macroscopic transactions is an ordered sequence of program states with an entropy-spiking ending state and the transactional entropy value is a measure of uncertainty associated with transitioning between macroscopic transactions; and
   identifying a program state in the sequence of program states and associated with a program state entropy value that is substantially equal to the transactional entropy value as occurring at a macroscopic transaction boundary.

2. A method as defined in claim 1 wherein identifying the transactional entropy value associated with the macroscopic transactions of the workload comprises:
   identifying a set of macroscopic transactions associated with the workload;
   monitoring the workload; and
   calculating probabilities of execution for each macroscopic transaction in the set of macroscopic transactions;
   converting the probabilities to the transactional entropy value.

3. A method as defined in claim 2 wherein converting the probabilities to the transactional entropy value comprises calculating a sum of (1) a product of (a) a probability of executing a first macroscopic transaction and (b) a logarithm of the probability of executing the first macroscopic transaction, and (2) a product of (a) a probability of executing a second macroscopic transaction and (b) a logarithm of the probability of executing the second macroscopic transaction.

4. A method as defined in claim 3 wherein converting the probabilities to the transactional entropy value further comprises multiplying the sum with a constant.

5. A method as defined in claim 1 wherein the transactional entropy value varies as a function of time.

6. A method as defined in claim 1 wherein identifying a program state in the sequence of program states as a macroscopic transaction boundary comprises:
   comparing the program state entropy values to the transactional entropy value; and
   identifying at least one program state associated with a program state entropy value that is substantially equal to the transactional entropy value as at least one macroscopic transaction boundary.

7. A method as defined in claim 1 wherein a macroscopic transaction boundary occurs at a last program state in a program phase.

8. A method as defined in claim 1 wherein developing the trace comprises developing at least one of a program counter trace, an instruction pointer trace, a basic block trace, and a memory address trace.

9. A method as defined in claim 1 wherein identifying the sequence of program states comprises:
   assigning possible state signatures to sets of entries in the trace;
   selecting one of the possible state signatures as a first state signature;
   comparing the first state signature to at least one subsequent one of the possible state signatures; and
   if the at least one subsequent one of the possible state signatures differs from the first state signature by at least a predetermined amount, identifying the subsequent one of the possible state signatures as a second state signature.

10. A method as defined in claim 9 wherein assigning possible state signatures to sets of entries in the trace comprises:
    developing a first possible state signature from a first set of entries in the trace; and
    developing a second possible state signature from a second set of entries in the trace, the first set of entries partially intersecting the second set of entries.

11. A method as defined in claim 10 wherein developing the first possible state signature for the first set of entries in the trace comprises:
    weighting members of the first set such that later members have greater weight than earlier members; and
    mapping the weighted members to a bit vector signature.

12. A method as defined in claim 1 wherein determining the program state entropy values associated with the program states identified in the sequence comprises:
    determining probabilities of transitioning from a first one of the program states to a plurality of the program states; and
    converting the probabilities to a program state entropy value for the first program state.

13. A method as defined in claim 12 wherein the probabilities comprise at least one of moving averages and exponential moving averages.

14. A method as defined in claim 12 wherein converting the probabilities to the program state entropy value for the first program state comprises calculating a sum of (1) a product of (a) a probability of transitioning from the first program state to a second program state and (b) a logarithm of the probability of transitioning from the first program state to the second program state, and (2) a product of (a) a probability of transitioning from the first program state to a third program state and (b) a logarithm of the probability of transitioning from the first program state to the third program state.

15. A method as defined in claim 14 wherein converting the probabilities to a program state entropy value for the first program state further comprises multiplying the sum with a constant.

16. A tangible article of manufacture storing machine readable instructions to detect a macroscopic transaction boundary in a program workload, the machine readable instructions, when executed, cause a machine to:

develop a trace of a program associated with the workload;

identify a sequence of program states from the trace;

determine program state entropy values associated with the program states identified in the sequence;

identify a transactional entropy value associated with macroscopic transactions of the workload, wherein each of the macroscopic transactions is an ordered sequence of program states with an entropy-spiking ending state and the transactional entropy value is a measure of uncertainty associated with transitioning between macroscopic transactions; and identify a program state in the sequence of program states and associated with a program state entropy value that is substantially equal to the transactional entropy value as occurring at a macroscopic transaction boundary.

17. An article of manufacture as defined in claim 16 wherein the transactional entropy value varies as a function of time.

18. An apparatus to detect a macroscopic transaction boundary in a program workload comprising:

a macroscopic transaction monitor to identify a transactional entropy value associated with macroscopic transactions of the workload;

a trace sampler to develop a trace of a program;

a state identifier to identify a sequence of program states from the trace; and a predictor to determine program state entropy values associated with the identified program states, and to identify a program state in the program states and associated with a program state entropy value that is substantially equal to the transactional entropy value as occurring at a macroscopic transaction boundary; wherein at least one of the macroscopic transaction monitor, the trace sampler, the state identifier or the predictor comprises machine executable instructions stored on a tangible computer accessible storage medium, and wherein each of the macroscopic transactions is an ordered sequence of program states with an entropy-spiking ending state and the transactional entropy value is a measure of uncertainty associated with transitioning between macroscopic transactions.

19. An apparatus as defined in claim 18 wherein the macroscopic transaction monitor further comprises:

a macroscopic transition monitor to calculate probabilities of execution for the macroscopic transactions in the workload; and a transactional entropy calculator to convert the probabilities to the transactional entropy value.

20. An apparatus as defined in claim 19 wherein the transactional entropy calculator converts the probabilities to the transactional entropy value by calculating a sum of (1) a product of (a) a probability of executing a first macroscopic transaction and (b) a logarithm of the probability of executing the first macroscopic transaction, and (2) a product of (a) a probability of executing a second macroscopic transaction and (b) a logarithm of the probability of executing the second macroscopic transaction.

21. An apparatus as defined in claim 20 wherein the transactional entropy calculator converts the probabilities to the transactional entropy value by multiplying the sum with a constant.

22. An apparatus as defined in claim 18 wherein the transactional entropy value varies as a function of time.

23. An apparatus as defined in claim 18 wherein the predictor identifies a program state as a macroscopic transaction boundary by:

comparing the program state entropy values to the transactional entropy value; and identifying at least one program state associated with a program state entropy value that is substantially equal to the transactional entropy value as at least one macroscopic transaction boundary.

24. An apparatus as defined in claim 18 wherein a macroscopic transaction boundary occurs at a last program state in a program phase.

\* \* \* \* \*